(12) United States Patent
Gohl et al.

(10) Patent No.: US 10,218,027 B2
(45) Date of Patent: Feb. 26, 2019

(54) VEHICLE STARTER BATTERY

(71) Applicant: A123 Systems, LLC, Waltham, MA (US)

(72) Inventors: Jerry Gohl, Brighton, MI (US); Timothy Hughes, Livonia, MI (US); Arfan Ahmad, Windsor (CA); Jason Davis, Commerce Township, MI (US); Robert Dickie, Canton, MI (US); Kevin Martus, Howell, MI (US); Michael Shenberger, Walled Lake, MI (US); David Allen, Wixom, MI (US)

(73) Assignee: A123 Systems, LLC, Waltham, MA (US)

( * ) Notice: Subject to any disclaimer, the term of this patent is extended or adjusted under 35 U.S.C. 154(b) by 526 days.

(21) Appl. No.: 14/537,812

(22) Filed: Nov. 10, 2014

(65) Prior Publication Data

US 2015/0132622 A1 May 14, 2015

Related U.S. Application Data

(60) Provisional application No. 61/902,689, filed on Nov. 11, 2013.

(51) Int. Cl.
| | | |
|---|---|---|
| *H01M 10/04* | (2006.01) | |
| *H01M 2/10* | (2006.01) | |
| *H01M 10/0525* | (2010.01) | |
| *H01M 2/04* | (2006.01) | |
| *H01M 2/26* | (2006.01) | |
| *H01M 10/0585* | (2010.01) | |

(Continued)

(52) U.S. Cl.
CPC ..... *H01M 10/0481* (2013.01); *H01M 2/0434* (2013.01); *H01M 2/1077* (2013.01); *H01M 2/266* (2013.01); *H01M 10/0525* (2013.01); *H01M 10/0585* (2013.01); *H01M 2/0262* (2013.01); *H01M 2/0275* (2013.01); *H01M 2/0277* (2013.01); *H01M 2/0285* (2013.01); *H01M 2/0287* (2013.01); *H01M 10/0468* (2013.01); *H01M 10/48* (2013.01); *H01M 2220/20* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2,009,169 A | 7/1935 | Folberth et al. | |
| 5,082,463 A * | 1/1992 | Saimoto | H05K 3/4084 439/883 |
| 5,482,793 A | 1/1996 | Burns et al. | |

(Continued)

FOREIGN PATENT DOCUMENTS

| | | |
|---|---|---|
| JP | 4706170 B2 | 6/2011 |
| JP | 2012128983 A | 7/2012 |

*Primary Examiner* — Carmen V Lyles-Irving
(74) *Attorney, Agent, or Firm* — McCoy Russell LLP

(57) ABSTRACT

A starter battery is provided comprising a plurality of pouch-type prismatic cells stacked to form an array and configured to output a voltage sufficient to start a vehicle engine. The starter battery further includes a housing configured to contain the array wherein the housing includes a tray and a lid attached with the tray such that the housing provides a compressive force sufficient to prevent cell delamination and to constrain expansion or swelling of the cells during operation.

10 Claims, 36 Drawing Sheets

(51) Int. Cl.
*H01M 10/48* (2006.01)
*H01M 2/02* (2006.01)

(56) References Cited

U.S. PATENT DOCUMENTS

| | | |
|---|---|---|
| 6,773,848 B1 | 8/2004 | Nortoft et al. |
| 6,780,540 B2 | 8/2004 | Hoffman et al. |
| 6,969,567 B1 | 11/2005 | Higley et al. |
| 7,547,487 B1 | 6/2009 | Smith et al. |
| 7,807,288 B2 | 10/2010 | Yoon et al. |
| 7,892,669 B2 | 2/2011 | Yang et al. |
| 8,361,644 B2 | 1/2013 | Kane et al. |
| 8,426,057 B2 | 4/2013 | Park et al. |
| 8,486,557 B2 | 7/2013 | Lee et al. |
| 2002/0182480 A1 | 12/2002 | Hanauer et al. |
| 2003/0121142 A1 | 7/2003 | Kikuchi et al. |
| 2005/0110458 A1 | 5/2005 | Seman, Jr. et al. |
| 2008/0271311 A1 | 11/2008 | Hill et al. |
| 2009/0220853 A1 | 9/2009 | Yang et al. |
| 2009/0311581 A1 | 12/2009 | Park et al. |
| 2009/0325043 A1 | 12/2009 | Yoon et al. |
| 2011/0020694 A1 | 1/2011 | Khakhalev et al. |
| 2011/0027630 A1 | 2/2011 | Tsutsumi et al. |
| 2011/0076521 A1 | 3/2011 | Shimizu et al. |
| 2011/0111649 A1* | 5/2011 | Garascia ............ H01M 2/1077 439/890 |
| 2011/0117418 A1 | 5/2011 | Meintschel et al. |
| 2011/0135994 A1 | 6/2011 | Yang et al. |
| 2011/0159350 A1* | 6/2011 | Ochi .................. H01M 2/1077 429/159 |
| 2011/0189527 A1 | 8/2011 | Michelitsch et al. |
| 2011/0195285 A1 | 8/2011 | Shin et al. |
| 2011/0256446 A1 | 10/2011 | Bronczyk et al. |
| 2012/0107659 A1 | 5/2012 | Phlegm et al. |
| 2012/0214055 A1 | 8/2012 | Schaefer et al. |
| 2012/0295150 A1* | 11/2012 | Gao ..................... H01M 2/021 429/158 |
| 2013/0071721 A1* | 3/2013 | Ogasawara ......... H01M 2/1077 429/151 |
| 2013/0078487 A1 | 3/2013 | Shin et al. |
| 2013/0157084 A1 | 6/2013 | Bang et al. |
| 2013/0157113 A1 | 6/2013 | Yoshioka et al. |
| 2013/0177797 A1 | 7/2013 | Bronczyk et al. |
| 2013/0216880 A1 | 8/2013 | Park et al. |
| 2013/0295444 A1 | 11/2013 | Kim et al. |
| 2013/0309539 A1 | 11/2013 | Yoshioka et al. |
| 2013/0323549 A1 | 12/2013 | Choi et al. |
| 2013/0330595 A1 | 12/2013 | Lee et al. |
| 2015/0037634 A1* | 2/2015 | Malcolm ............ H01M 10/482 429/90 |

\* cited by examiner

VEHICLE STARTER BATTERY

CROSS REFERENCE TO RELATED APPLICATION

The present application claims priority to U.S. Provisional Patent Application No. 61/902,689, entitled "VEHICLE STARTER BATTERY," filed Nov. 11, 2013, the entire contents of which are hereby incorporated by reference for all purposes.

FIELD

The present description relates to the architecture, construction and operation of a vehicle starter battery, such as a Lithium-Ion vehicle starter battery.

BACKGROUND

An electric battery is a device that stores electric energy by means of an electrochemical cell. An electric battery may include a single electrochemical cell or a plurality of electrochemical cells, configured in parallel, series or a combination thereof. An electric battery may use an electrochemical cell to convert chemical energy to electric energy. The basis of this process is to derive electric energy in the form of the liberation of electrons as a result of a chemical reaction. There are multiple rechargeable battery chemistries including Nickel-Cadmium (NiCd), Lead-Acid, Nickel-Metal-Hydride (NiMH), Nickel-Zinc (NiZn), Lithium-Ion and Lithium Polymer. These batteries may be configured as cylindrical cells, button cells, prismatic cells, or pouch cells.

A battery cell comprises an anode and cathode with an electrolyte used to carry ions between the anode and cathode. The result of charging and discharging a battery cell via an electrochemical process may include the release of gas, the generation of heat, or the deposition of material on an electrode. These electrochemical processes may cause the battery cell to swell or expand.

Other components may also be used to store electric energy, for example, a capacitor stores electric energy electrostatically by means of an electric field being applied to two plates separated by a dielectric such that the electrons gather and are held by the electric field.

SUMMARY

A starter battery comprises a plurality of pouch-type prismatic cells stacked to form an array and configured to output a voltage sufficient to start a vehicle engine; a housing configured to contain the array wherein the housing includes a tray and a lid attached with the tray such that the housing provides a compressive force sufficient to prevent cell delamination and to constrain expansion or swelling of the cells during operation. The battery may further include a plate or frame disposed between the array and lid, and having a generally flat surface configured to distribute the compressive force over the array. The frame may have a honeycomb or ribbed structure. The tray and lid may each include interlock features configured to align and secure the tray with the lid. The lid may be bonded to the tray. The lid may be fastened, such as mechanically fastened, to the tray. The battery may further include a plurality of pads interleaved with and adhered to the cells to prevent relative movement of the cells.

A starter battery comprises a dielectric frame defining a plurality of slots and supporting a plurality of weld members embedded therein; and a plurality of prismatic cells stacked to form an array, each of the cells having a tab projecting through one of the plurality of slots and being folded over one of the plurality of weld members; a bus bar disposed on the frame and bonded with the tabs and weld members. The battery may further include a substrate configured to support the bus bar. The substrate may be a flex circuit. Each of the tabs may be sandwiched between one of the weld members and the bus bar. A length of each of the tabs may be greater than or equal to a thickness of the frame and a width of one of the weld members.

A starter battery comprises a dielectric frame defining a plurality of slots and supporting a plurality of weld members embedded therein; a plurality of prismatic cells stacked to form an array, each of the cells having a tab projecting through one of the plurality of slots and being folded over one of the plurality of weld members and being bonded thereto; and a flex circuit disposed on the frame, electrically connected to the tabs, and capable of carrying one or more of a voltage sensing and cell balancing current.

A battery includes a plurality of prismatic cells each having a terminal extending therefrom, a dielectric frame including a plurality of weld members, and a bus bar supported on a flexible substrate arranged to form an array having a sandwiched bus bar arrangement electrically connecting the cells. Each of the terminals is bent over one of the weld members, and disposed between and bonded with one of the weld members and the bus bar to form the sandwiched bus bar arrangement. The battery may further include a frame configured to support the weld members and defining plurality of slots, and each of the terminals may extend through one of the slots. The flexible substrate may be a flex circuit. The battery may further include a thermistor, and the flex circuit may define a tab having the thermistor mounted thereon. The tab may be folded into the array such that the thermistor is in contact with one of the terminals.

A battery includes a plurality of prismatic cells stacked to form an array, each of the cells having a terminal, a bus bar disposed over a portion of the array and electrically connected with at least some of the terminals, a flex circuit configured to support the bus bar and defining a tab, and a thermistor attached with the tab. The tab is folded into the array such that the thermistor is in contact with one of the terminals. The thermistor may also be in contact with one of the cells or an electrode of one of the cells.

DETAILED DESCRIPTION

Figure 1:
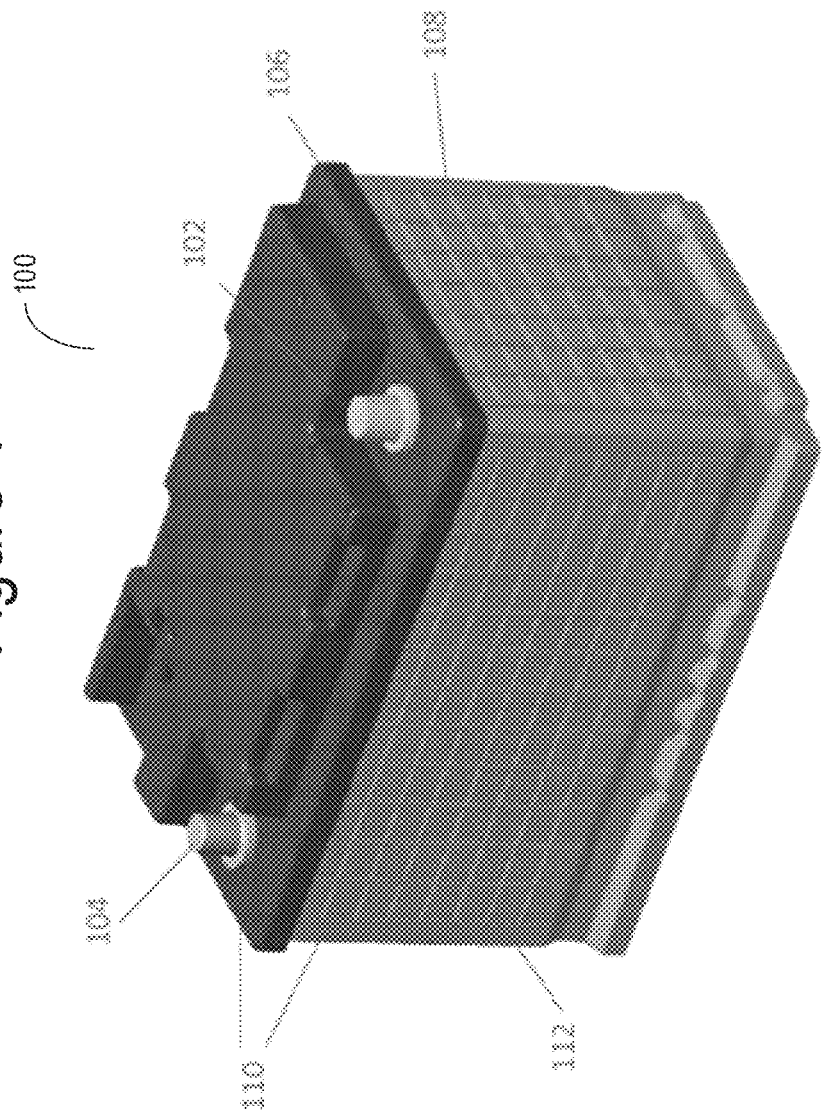
FIG. 1 is a perspective view of a starter battery.

Embodiments of the present invention are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following descriptions relate to the assembly and manufacture of a starter battery. A starter battery may contain a plurality of prismatic or cylindrical cells stacked to form an array, and configured in series and parallel to deliver a voltage and current sufficient to meet the demands of the battery. Battery cells may have cell terminals extending from one of their ends that protrude though a plurality of slots in a lower bus bar assembly. The cell terminals may then be folded over and bonded to weld fingers in the lower bus bar assembly and may be connected in series and parallel through a series of electrical connections with upper or lower bus bars. Current from the battery cells may be carried to a flex circuit which can then be transferred to additional battery components such as a battery management module to monitor the voltage of the battery cells. The exact arrangement, welding, and electrical connections between the battery cell terminals, bus bars, and the flex circuit may be different depending on the specific type of starter battery.

In the following description, several configurations for securing, and electrically connecting the battery cell terminals are given. In all configurations, battery cell terminals are folded over a lower bus bar and welded to the lower bus bar. Additionally, a flex circuit is attached to the lower bus bar and is electrically connected with the cell terminals to carry an electrical sensing current to a battery management module to monitor the voltages of the battery cells. The configurations may differ in whether or not one or more upper bus bars are used to secure the battery cell terminals to the lower bus bar, and in how the flex circuit is secured to the lower bus bar. In some approaches, battery cell terminals are sandwiched between the lower bus bar and the upper bus bars. The upper bus bars may be either fixedly attached to the flex circuit, or the flex circuit may be attached to the lower bus bar independently of the upper bus bars. In another approach, the battery cell terminals are directly welded onto a lower bus bar without the use of any upper bus bars. Each approach to the welding and electrical coupling of the battery cell terminals offers certain advantages depending on the specific type of starter battery being manufactured.

FIG. 1 is a perspective view of a starter battery 100 with a positive terminal 102 and a negative terminal 104. This figure is drawn to scale, but other dimensions and relative scales may be used. The starter battery may be a lithium-ion battery or any other rechargeable starter battery (e.g. Nickel-Cadmium (NiCd), Lead-Acid, Nickel-Metal-Hydride (NiMH), Nickel-Zinc (NiZn), etc.) suitable for storing electrical energy. The starter battery 100 has a lid 106 and battery case tray 108. The end of the battery where the lid 106 is located may be referred to herein as the 'top' of the starter battery 100. The 'bottom' of the starter battery 100 may refer to the end of the starter battery 100 opposite the lid 106. The lid 106 and tray 108 may be physically coupled to one another to form a battery case 110. In one embodiment, the battery case 110 may be a hollow rectangular prism that houses internal components of the starter battery. In another embodiment the tray may be cylindrical. The battery case tray 108 includes ridges 112 that may be arranged to form a grid that is raised from the surface of the battery case tray 108, to provide support, strength and increased rigidity to the battery case 110.

Figure 2:
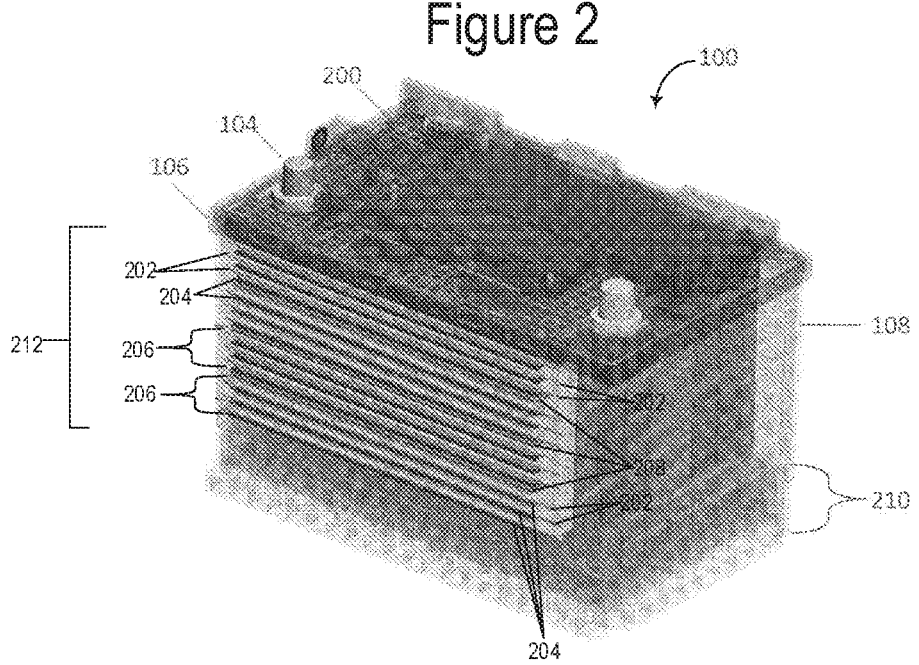
FIG. 2 is a perspective view of the internal structure of the starter battery of FIG. 1.

FIG. 2 is a perspective view of the internal structure and components of the starter battery 100. Starting from the bottom of the starter battery 100 and moving up towards the battery case lid 106, the internal structure comprises a battery cell tray bottom 210, a stack of battery cells 202, compliance pads 204, electrical isolation spacers 208, and a compression plate 200. The battery cell tray bottom 210 may lie inside and at the bottom of the battery case tray 108 of the battery case 110. Directly above the battery cell tray bottom 210 lies a plurality of battery cells 202, compliant pads 204, and electrical isolation spacers 208, stacked on top of one another. As explained further in FIG. 4, a number of battery cells 202 may be configured in parallel to form parallel cell groups 206. Compliant pads 204 may be placed between the battery cells 202 of each of the parallel cell groups 206, and may be made of an open or closed cell foam or a combination thereof, and may compose characteristics including resilience. Configuring battery cells 202 in parallel may supply the desired battery current. To meet the desired battery voltage, multiple cell groups 206 may be configured in series. When the parallel cell groups 206 are stacked, an electrical isolation spacer 208 may be placed between the parallel cell groups 206 to mitigate excessive current draws between the parallel cell groups 206. The stack of parallel cell groups 206 consisting of battery cells 202 and compliant pads 204, together with the electrical isolation spacers 208 may form a cell array 212. A compression plate 200 may lie above the cell array 212, below the lid 106. As described in FIG. 1, the battery case lid 106 may house the battery terminals 102 and 104. The compression plate 210 may be a polymer, metal, or metal reinforced polymer designed to have rigidity such that it evenly distributes a force across the surface of the battery cells. The battery cells 202, compliant pads 204 and isolating spacers 208 are pressed together between the compression plate 200 and the battery cell tray bottom 210. Thus, the compression plate 200 may provide a compressive force that reduces relative lateral, horizontal movement of the components of the cell array 212 (e.g. battery cells 202, compliance pads 204, and electrical isolation spacers 208). Additionally, the compliant pads 204 may limit the relative movement between components of the cell array 212 due to their resilient and adhesive properties.

In one embodiment, the starter battery 100 may be used as a starter battery for an automotive vehicle and may output a voltage in the range of 6 to 60 volts. In another embodiment the starter battery may be used in other applications and may output voltages less than 6 volts or greater than 60 volts.

Figure 3:
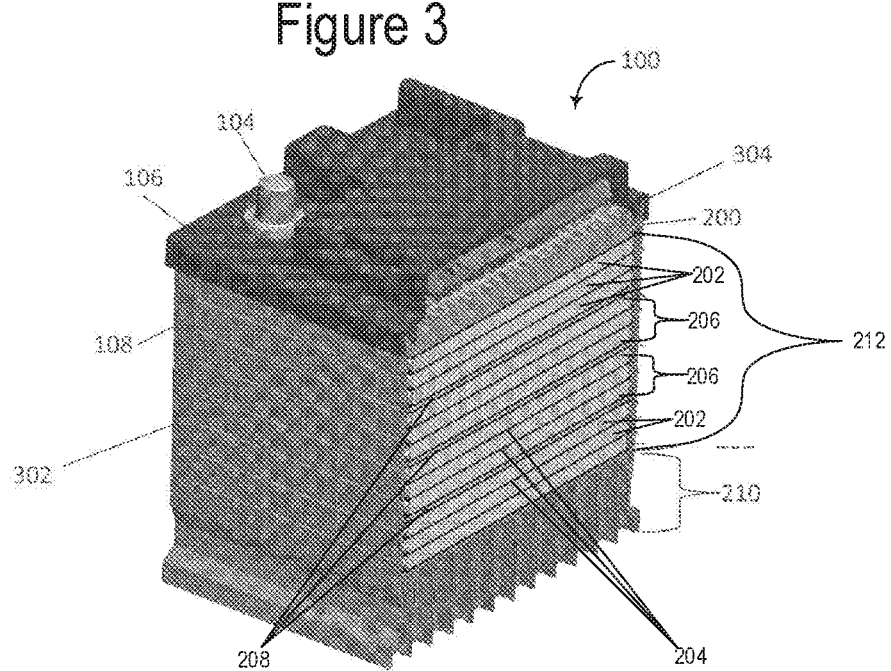
FIG. 3 is a perspective view, in cross-section, of the starter battery of FIG. 1.

FIG. 3 is a perspective cross sectional view of the starter battery 100. The battery case lid 106 and the battery case tray 108 cooperate at the perimeter of the battery case tray lip 302, which is received into one or more corresponding recesses 304 on the battery case lid 106. The battery case lid 106 also cooperates with the compression plate 200 to secure the battery cell array 212, which may include one or more of the battery cells 202, one or more of the compliant pads 204, and one or more of the electrical isolation spacers 208. As described in FIG. 2, the internal components of the starter battery 100 include the battery cell tray bottom 210, cell array 212, and compression plate 200. The negative terminal 104 of the starter battery 100 is shown housed in the battery case lid 106.

Figure 4:
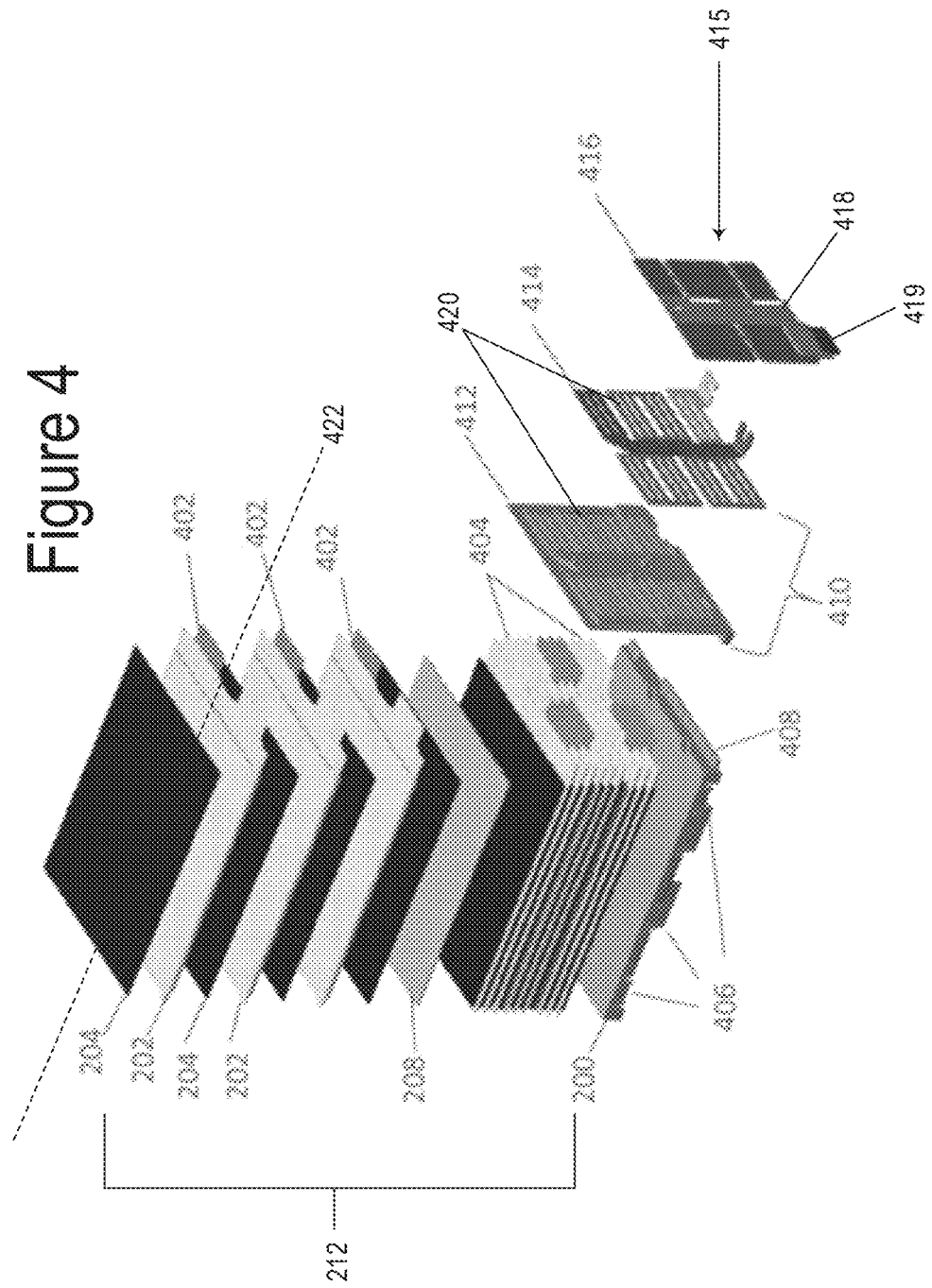
FIG. 4 is an exploded perspective view of the starter battery of FIG. 1.

Moving on to FIG. 4, an exploded view of the arrangement of the internal battery components is shown. Battery cells 202 may be stacked with the compliant pads 204 in between. Electrical isolation spacers 208 may be placed in between parallel cell groups 206. Together the battery cells 202, compliant pads 204, and electrical isolation spacers 208 may form the cell array 212. The components of the cell array 212 may be relatively flat, planar, thin rectangular prisms and resemble rectangular plates having two longer sides and two shorter sides. Each one of the battery cells 202 may have a positive cell terminal 404 and a negative cell terminal 402 (herein also referred to as battery cell terminals 402 and 404) that extend from an end of the battery cells 202. The battery cell terminals 402 and 404 may be thin, flat, rectangular tabs that extend outward from the battery cells 202. The positive cell terminals 404 and the negative cell terminals 402 on each one of the battery cells 202 may be physically distinct and separated a distance from one another at one end of the battery cells 202. The battery cell terminals 402 and 404 may be located at one of the short ends of the battery cells 202. Specifically, the positive and negative battery cell terminals 402 and 404 of each one of the battery cells 202 may be spaced from one another in a symmetric fashion such that if one of the battery cells 202 were folded over its center longitudinal axis 422, the battery cell terminals 402 and 404 may align directly over one another. The battery cells 202 of the cell array 212 may be oriented in the same direction such that the battery cell terminals 402 and 404 from all the battery cells 202 protrude from the same end of the cell array 212. When stacked, adjacent battery cells 202 may either be arranged such that the cell terminals 402 and 404 are aligned in a matching orientation where like polarities abut one another or in an alternating configuration where opposite polarities abut one another. Said another way, the negative cell terminals 402 and positive cell terminals 404 of adjacent battery cells 202 may be oriented in the same or opposite position relative to one another. Thus, the negative cell terminal 402 of one of the battery cells 202 may be aligned with the negative cell terminal 402 of adjacent battery cells 202 in a matching orientation, or the negative terminal 402 of one of the battery cells 202 may be aligned with the positive terminal 404 of another one of the battery cells 202 in an alternating configuration.

The battery cells 202 may be arranged in groups of three parallel cells as parallel cell groups 206 as shown in FIG. 3 by aligning the battery cell terminals 402 and 404 of the battery cells in the matching orientation described above. As shown in FIG. 3, parallel cell groups 206 may be used to meet the current supply requirements of the starter battery 100. The parallel cell groups 206 may then be arranged in series with one another which may be configured by stacking the parallel cell groups 206 such that their battery cell terminals 402 and 404 are aligned in an alternating polarity fashion. The electrical isolating spacer 208 is a dielectric sized to provide a gap between adjacent parallel cell groups 206 such that abutting battery cell terminals 402 and 404 of opposite polarity maintain a distance sufficient to limit the flow of current between the cell terminals of each cell group. The battery cells 202, compliant pads 204, and the electrical isolation spacers 208 are aligned in the cell array 212 between the compression plate 200 and the battery case base 210.

The cell array 212 comprises the battery cells 202 and their corresponding battery cell terminals 402 and 404 stacked on top of one another. The stacked battery cell terminals 402 and 404 be aligned at one end of the cell array 212 and may be grouped in parallel cell groups 206 stacked in alternating polarity, each one of the parallel cell groups 206 itself comprising battery cell terminals 402 or 404 of the same polarity.

The battery cell terminals 402 and 404 may be connected in series and parallel by a lower bus bar assembly 410 and an upper bus bar assembly 415. In one embodiment the upper bus bar assembly 415 may be electrically coupled to the battery cells terminals 402 and 404 and may carry all or a portion of the current between the battery cell terminals 402 and 404. In another embodiment, the lower bus bar 414 may be electrically coupled to the battery cell terminals 402 and 404 and may carry all or a portion of the current between the battery cell terminals 402 and 404. In another embodiment, the lower bus bar 414 and the upper bus bar assembly 415 may be electrically connected to the battery cell terminals 402 and 404, and both the lower bus bar 414 and upper bus bar assembly 415 may carry current between the battery cell terminals 402 and 404. The lower bus bar assembly 410 may include a plastic housing or support frame 412 (or other electrically isolating structure) to position and retain a lower bus bar, which in this example is lower bus bar 414, within the support frame 412. Support frame 412 comprises an electrically isolating dielectric material, such as plastic, as described above. The support frame 412 may therefore also be referred to herein as dielectric frame 412. Both the support frame 412 and the lower bus bar 414 may have a plurality of narrow openings or slits 420 arranged in two cell terminal columns 608 to receive the battery cell terminals 402 and 404. When assembled, the support frame 412 and lower bus bar 414 may be positioned such that the slits 420 in the support frame 412 line up with the slits 420 of the lower bus bar 414 as explained in greater detail below with reference to FIGS. 8 and 9. Thus, the lower bus bar assembly 410 may be aligned with and sized to match the area of the side of the cell array 212 from which the battery cell terminals 402 and 404 extend. When assembled all of the battery cell terminals 402 and 404 in the cell array 412 may extend through the slits 420 in both the support frame 412 and the lower bus bar 414.

The compression plate 200 includes alignment tabs 406 which cooperate with the battery cell case bottom 108, the battery cell case lid 106 or a combination of the two. In some embodiments, the compression plate 200 is affixed to the battery case lid 106 and is not affixed to the case bottom 108. The compression plate 200 also includes a flange 408 which cooperates with a lower bus bar assembly 410. An upper bus bar assembly 415 may be used to electrically connect battery cell terminals 402 and 404 in a configuration of parallel and series to meet the current and voltage requirements of the starter battery 100. The upper bus bar assembly 415 may comprise a flex circuit 418 and one or more upper bus bars 416. The flex circuit 418 may route electrical signals to a connector 419. The flex circuit 418 may physically contact battery cell terminals 402 and 404, and as such may carry an electrical sensing current which may be fed to a battery management system (not shown). The battery management system may in turn shut off the battery if battery cell voltages exceed a pre-set threshold that may lead to battery degradation. The flex circuit 418 may also carry a cell balancing current which may distribute current amongst the battery cells 202 such that battery cells 202 are maintained at an even state of charge. Upper bus bars 416 may be connected to the flex circuit 418 to carry all or a portion of the current between battery cells 202 connected therewith and to carry electricity to the connector 419. In one embodiment the upper bus bar assembly 415 may include both upper bus bars 416 and the flex circuit 418. In another embodiment the flex circuit 418 and upper bus bars 416 may be separate and not integrated into one cohesive structure.

Figure 5:
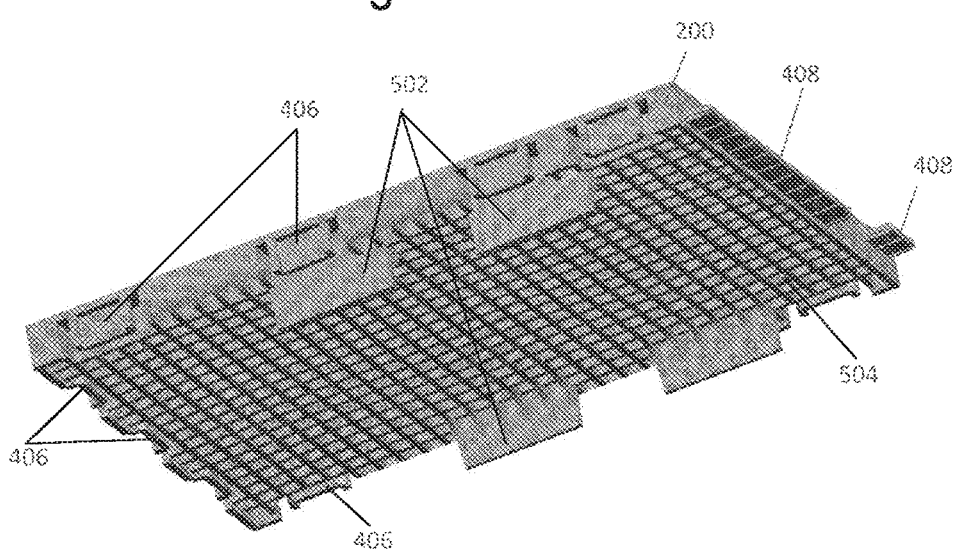
FIG. 5 is a perspective view of a compression plate.

FIG. 5 is a perspective view of the compression plate 200 providing details of the alignment tabs 406. The alignment tabs 406 are used to both align the battery cell case lid 106 with the compression plate 200, and to align the battery cell case lid 106 with the battery cell case tray 108. The compression plate may include additional alignment tabs 502 which can be used to cooperate with the battery case lid 106 to apply a force to the compression plate 200. The compression plate 200 may be solid or may include a honey comb or ribbed structure 504 to help provide structural strength and rigidity to evenly disburse a force when applied.

Figure 6:
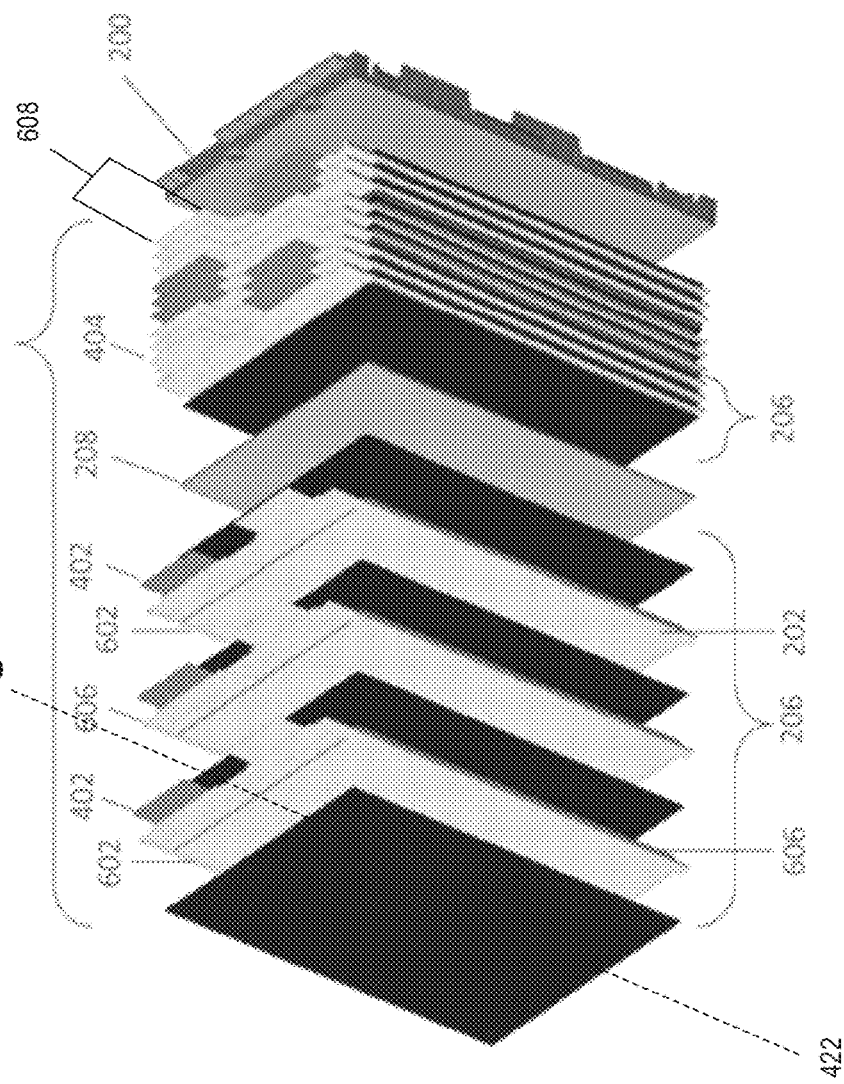
FIG. 6 is an exploded perspective view of a cell array and compression plate.

FIG. 6 is a perspective view of a stack of the battery cells 202, compliant pads 204 and isolating spacers 208 with the battery cell terminals 402 and 404 arranged to form parallel cell groups 206 within the cell array 212. The parallel cell groups 206 may consist of three battery cells 202 configured in parallel by stacking the battery cells 202 such that the battery cell terminals 402 and 404 are aligned in a matching polarity fashion as explained earlier in FIG. 4. The number of battery cells 202 configured in parallel may be more or less depending upon the current requirements of the starter battery 100. The parallel cell groups 206 may be connected in series with one another to meet the voltage requirements of the battery. This may be accomplished by alternating the parallel cell groups 206 as shown in FIG. 6 so that negative terminals 402 of one of the parallel cell groups 206 abut the positive terminals 404 of the adjacent parallel cell groups 206.

In one embodiment the battery cells 202 may be prismatic and may be housed in the battery case 110 in the embodiment where the battery case is rectangular. In another embodiment the battery cells 202 may be cylindrical and may be housed in the battery case 110 in the embodiment where the battery case is cylindrical. Shown in FIG. 6 are battery cells 202 in the embodiment in which they are rectangular prismatic cells having two large flat surfaces, top surface 602 and bottom surface 604 (not visible). The top surface 602 and bottom surface 604 are generally parallel to each other, and used for mechanical retention of the anode and cathode material or coatings on the anode and cathode along with thermal management of the battery cells 202. The enclosure of the battery cells 202 may be referred to as a 'pouch' because it is a non-rigid flexible sheet that is folded and bonded to create a cost-effective environmentally-sealed housing. The pouch's material may be a thin aluminum foil with a polymer coating applied to both surfaces. The pouch is thermally bonded and folded at the side edges, which provides a seal boundary 606. The polymer-coated pouch also includes a thermally-bonded flange at the bottom 608 and top 610, which seals the pouch. The folding of the sides decreases the module's physical area. The bottom flange 608 and top flange 610 size are selected so as to ensure long-term robustness. The flanges 608 and 610 are folded to create a compact width.

The battery cells 202 may contain two electrical terminals, negative terminal 402 and positive terminal 404, which may protrude from one of the pouch edges. The battery cell terminals 402 and 404 are environmentally sealed using electrically-isolative polymeric perimeter seals. The remaining portion of the pouch terminal edge is thermally bonded to create a fourth environmentally sealed boundary, which completes the battery cells 202 perimeter seal. The battery cell terminals 402 and 404 are positioned generally symmetrically with respect to the center longitudinal axis 422 of the battery cells 202, and preferably the battery cell terminals 402 and 404 are in the center plane of the battery cells 202. The battery cells 202 may be "flipped" 180 degrees around center longitudinal axis 422 with the result that each battery cell terminal 402 or 404 is in the same position that the opposite battery cell terminal 402 or 404 held prior to "flipping" the battery cells 202. As explained earlier with reference to FIG. 4, the battery cells 202 may be stacked on top of one another such that all of the battery cell terminals 402 and 404 are aligned with one another at one end of the cell array 212. Said another way, all the battery cell terminals 402 and 404 of the cell array 212 may be aligned at a single and same end of the cell array 212. Thus, when stacked, the battery cell terminals 402 and 404 may form two cell terminal columns 608 comprising the battery cell terminals 402 and 404. The cell terminal columns 608 are generally symmetric with respect to the center longitudinal axis 412 of the cell array 212. Said another way, the battery cell terminals 402 and 404 of all the battery cells 202 in the cell array 212 may be aligned with one another, such that the center longitudinal axis 422 of each one of the battery cells 202 is the same as the center longitudinal axis 422 as the cell array 212.

As explained above, the battery cells 202 may be stacked such that the battery cell terminals 402 and 404 of all the battery cells 202 in the cell array 212 may be aligned with one another to form two cell terminal columns 608 of stacked battery cell terminals 402 and 404. However, the relative orientation of the positive battery cell terminal 404 and negative battery cell terminal 402 in adjacent battery cells 202 may be altered depending on a parallel or series configuration of the battery cells 202 as explained above with reference to FIG. 4. Adjacent parallel cell groups 206 may be aligned in series, such that the positive battery cell terminals 404 of one of the parallel cell groups 206 may abut the negative battery cell terminals 402 of the other parallel cell groups 206. Each one of the cell terminal columns 608 of stacked battery cell terminals 402 and 404 contains one of the two cell terminals 402 or 404 from each one of the battery cells 202 in the cell array 212. Accordingly, cell terminal columns 608 comprise parallel cell groups 206 stacked in alternating polarity, each one of the parallel cell groups 206 itself comprising battery cell terminals 402 or 404 of the same polarity. The distance between the battery cell terminal columns 608 may be the same as the distance between the two battery cell terminals 402 and 404 of each of the battery cells 202. Isolation spacer 208 may be inserted between parallel cell groups 206 arranged in series to provide a distance for electrical isolation.

Figure 7:
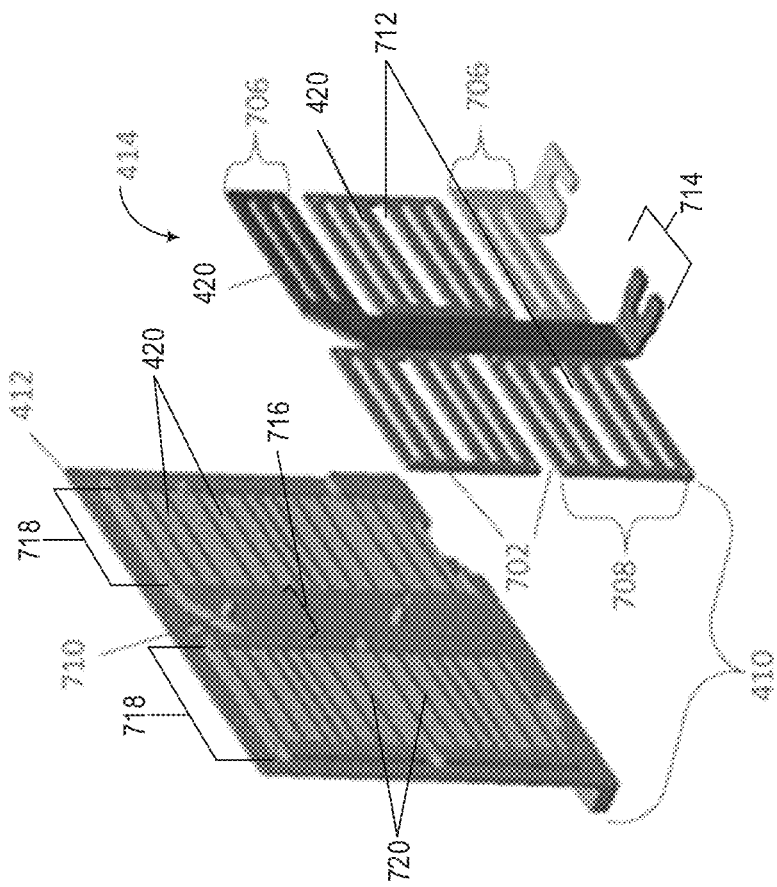
FIG. 7 is a perspective view of a support frame and lower bus bar of a lower bus bar assembly.

FIG. 7 is perspective view of the lower bus bar assembly 410 with a support frame 412 and a lower bus bar 414. The lower bus bar 414 may be made of a single metal, a metal alloy, a plated metal, bi-metallic member or plated bi-metallic member. The lower bus bar 414 may include multiple individual electrically isolated weld fingers 702 physically coupled to either side of a center support structure 714. The center support structure 714 may be the same thickness as the isolated weld fingers 702 such that the lower bus bar 414 as a whole may be relatively flat and planar and may resemble a flat panel. The width of the center support structure 714 may be similar to that of a center section 716 of the support frame 412 and may overlay the center section 716 when the lower bus bar 414 is aligned with the support frame 412. In one example the width of the center support structure 714 may be the same as that of the center section 716. In another embodiment, the width of the center support structure 714 and the center section 716 may be different.

The lower bus bar 414 and the bus bar support frame 412 are arranged with corresponding slits 420 which are sized to allow the battery cell tabs 402 and 404 to pass through. The weld fingers 702 may also have surfaces between the slits 420 sized to allow battery cell terminals 402 and 404 to be welded thereto when the battery cell terminals 402 and 404 are bent to lie coincident with the surface. Some of the electrically isolated weld fingers 702 may be configured as series weld fingers 706 that may electrically connect battery cell terminals 402 and 404 in series. Other electrically isolated weld fingers 702 may be configured as parallel weld fingers 708 that may electrically connect battery cell terminals 402 and 404 in both series and parallel 708. The parallel weld fingers 708 may contain a parallel size slot 712 to connect battery cell terminals 402 and 404 in parallel and sized to compensate for the additional isolation spacer 208.

The lower bus bar support frame 412 is configured to support the lower bus bar 414. It may include alignment devices 710 to assist in the alignment of the upper bus bar assembly 415 with the battery cell terminals 402 and 404 and the lower bus bar 414. The lower bus bar support frame 412 may contain two cell terminal support sections 718 on either side of its center section 716. The cell terminal support sections 718 may be aligned over the cell terminal columns 608 of stacked battery cell terminals 402 and 404 and may include the slits 420 that allow the battery cell terminals 402 and 404 to pass through. The isolated weld fingers 702 of the lower bus bar 414 may overlay the cell terminal support sections 718 such that the slits 420 of the lower bus bar 414 and the support frame 412 line up with one another. Additionally, the cell terminal support sections 718 may include a series of raised ridges 720 which may be sized to fit in the gaps between series weld fingers 706 and parallel weld fingers 708. The ridges 720 may provide electrical isolation between the series and parallel weld fingers 706 and 708 respectively. The bus bar support frame 412 may include a mechanism to engage with the battery cell case tray 108, the battery cell case lid 106 or the battery compression plate 200, or a combination thereof.

Thus, the lower bus bar assembly 410 comprises a support frame 412 and lower bus bar 414. The support frame 412 and lower bus bar 414 have matching slits 420 that when aligned allow the battery cell terminals 402 and 404 to pass through the lower bus bar assembly 410.

Figure 8:
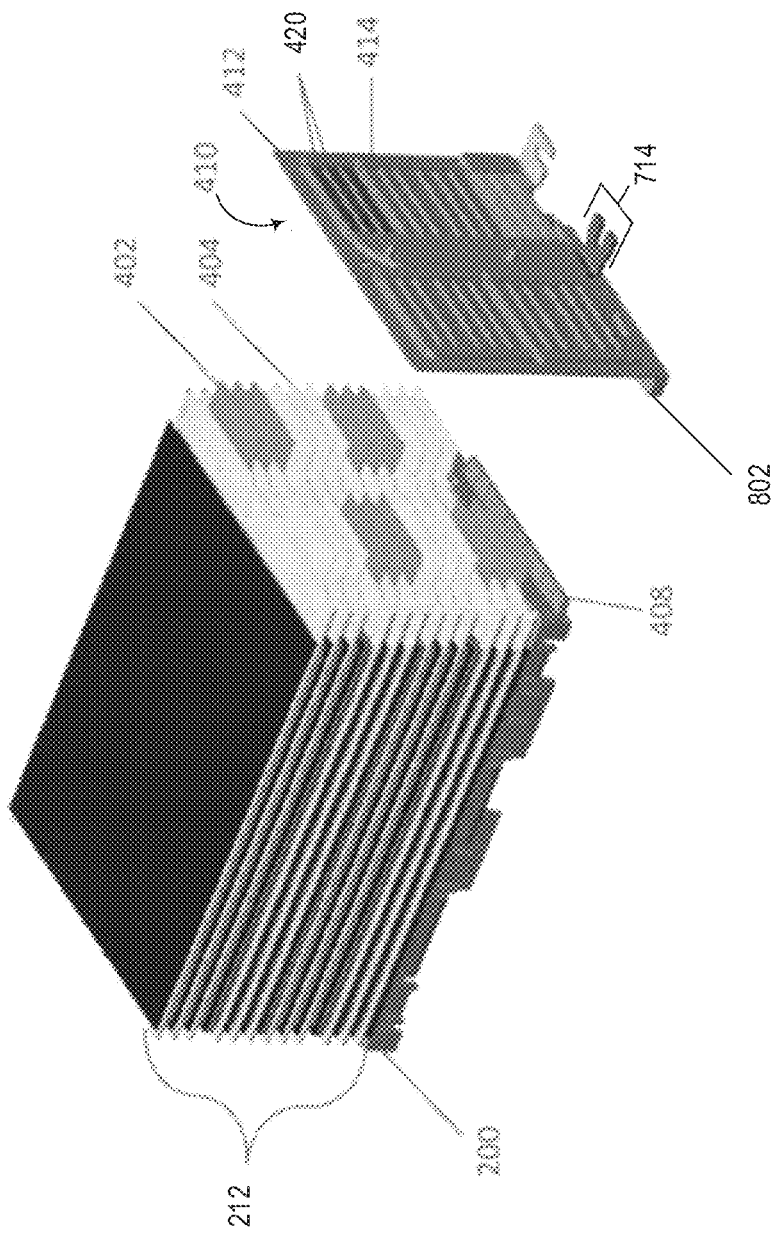
FIG. 8 is a perspective view of the cell array from FIG. 6 and compression plate aligned with the lower bus bar assembly.

FIG. 8 is a perspective view of the cell array 212 and compression plate 200 aligned with the lower bus bar assembly 410 such that the battery cell terminals 402 and 404 may pass through the slits 420 in the lower bus bar support frame 412 and the lower bus bar 414. The lower bus bar support frame 412 and the lower bus bar 414 may be directly coupled to one another without additional components separating the lower bus bar support frame 412 from the lower bus bar 414. Thus, the lower bus bar 414 and the support frame 412 are physically coupled to one another and their slits 420 are aligned with one another to provide openings for the battery cell terminals 402 and 404 to pass unimpeded through the lower bus bar assembly 410. The center support structure 714 of the lower bus bar 414 may overlay the center section of 716 of the support frame 412. Thus, the lower bus bar assembly 410 may comprise two layers: a first layer comprising the support frame 412 that is nearer the cell array 212 than a second outer layer comprising the lower bus bar 414. Both the layers may have matching parts that are similarly sized and aligned over one another. Specifically, both the isolated weld fingers 702 of the lower bus bar 414 and the support frame 412 may contain slits 420 that are arranged in one or more columns that may be the same size. The columns of slits 420 may be separated by first distance. In one embodiment that first distance between the columns of slits 420 may be the same in the lower bus bar 414 and the support frame 412. In another embodiment the distance separating the columns of slits 420 may be different between the lower bus bar 414 and the support frame 412. The alignment devices 710 of the support frame 412 may protrude through the center support structure 714 so as to properly position the upper bus bar assembly 415 with the lower bus bar assembly 410. The flange 408 is configured to cooperate with the lower bus bar support frame 412. Specifically, the bottom lip 802 of the lower bus bar frame may have a mating slit (not shown) into which the flange 408 of the compression plate may be secured.

The slits 420 in the lower bus bar assembly 410 are arranged in two cell terminal columns 608 separated by the center support structure 714 of the lower bus bar 414 which overlays the center section 718 of the support frame 412. It should be noted that the width of the center support structure 714 and thus the distance between the two cell terminal columns 608 of slits 420, may be the same as the distance between the two cell terminal columns 608 of stacked battery cell terminals 402 and 404. Thus, the lower bus bar assembly 410 may be sized and appropriately configured to allow the battery cell terminals 402 and 404 to pass through while covering the side of the cell array 212 from which the battery cell terminals 402 and 404 protrude.

Figure 9:
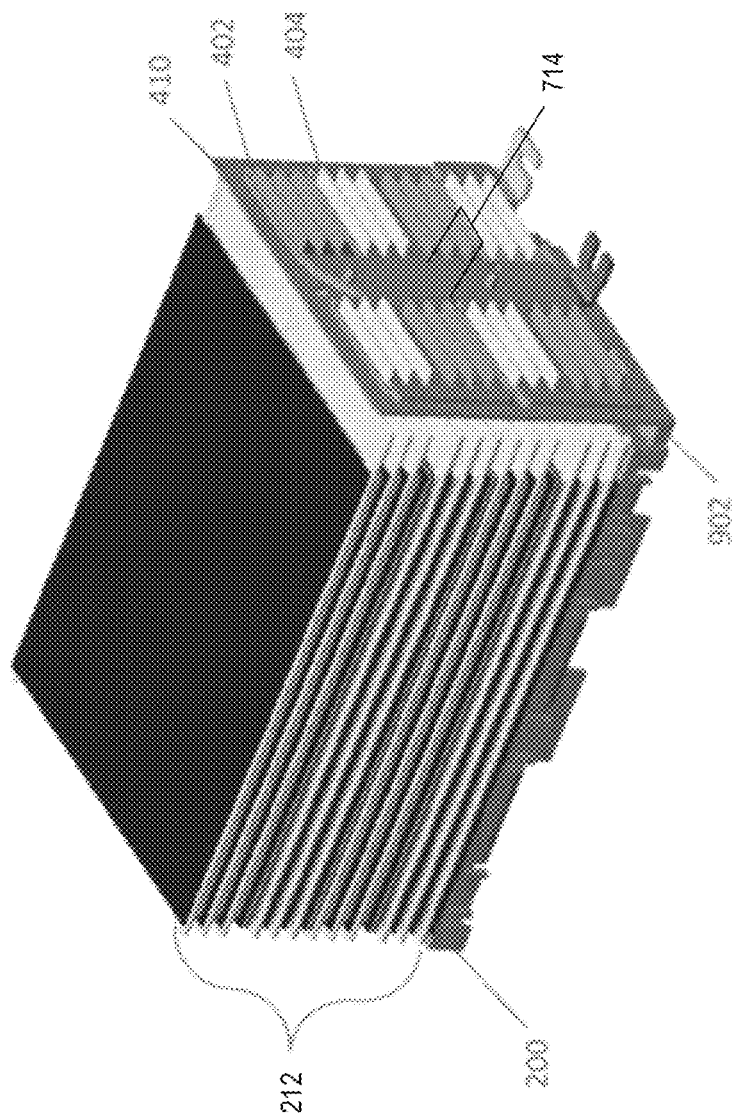
FIG. 9 is a perspective assembly view of battery cell terminals protruding through slots of the lower bus bar assembly.

FIG. 9 is a perspective view of the battery cell array 212 arranged with the battery cell terminals 402 and 404 protruding through the lower bus bar assembly 410. The lower bus bar assembly 410 may be aligned with the cell array 212 such that it may retain all of the battery cell terminals 402 and 404 of the cell array 212 and may be sized to adequately cover the entire side of the cell array 212 from which the battery cell terminals 402 and 404 protrude. Thus, the center support structure 714 of the lower bus bar 414 may cover the gap between the cell terminal columns 608 of stacked batter cell terminals 402 and 404. The cell terminal columns 608 of battery cell terminals 402 and 404 are arranged in parallel groups 206. Parallel cell groups 206 are stacked in alternating polarity in each one of the cell terminal columns 608, such that the negative cell terminals 402 of one parallel group 206 are adjacent to the positive cell terminals 404 of the neighboring parallel cell groups 206. The lower bus bar assembly 410 and the compression plate 200 may be physically coupled to one another at point 902 via the mating flange 408 of the compression plate 200 and a slit in the bottom lip 802 of the lower bus bar assembly 410.

Figure 10:
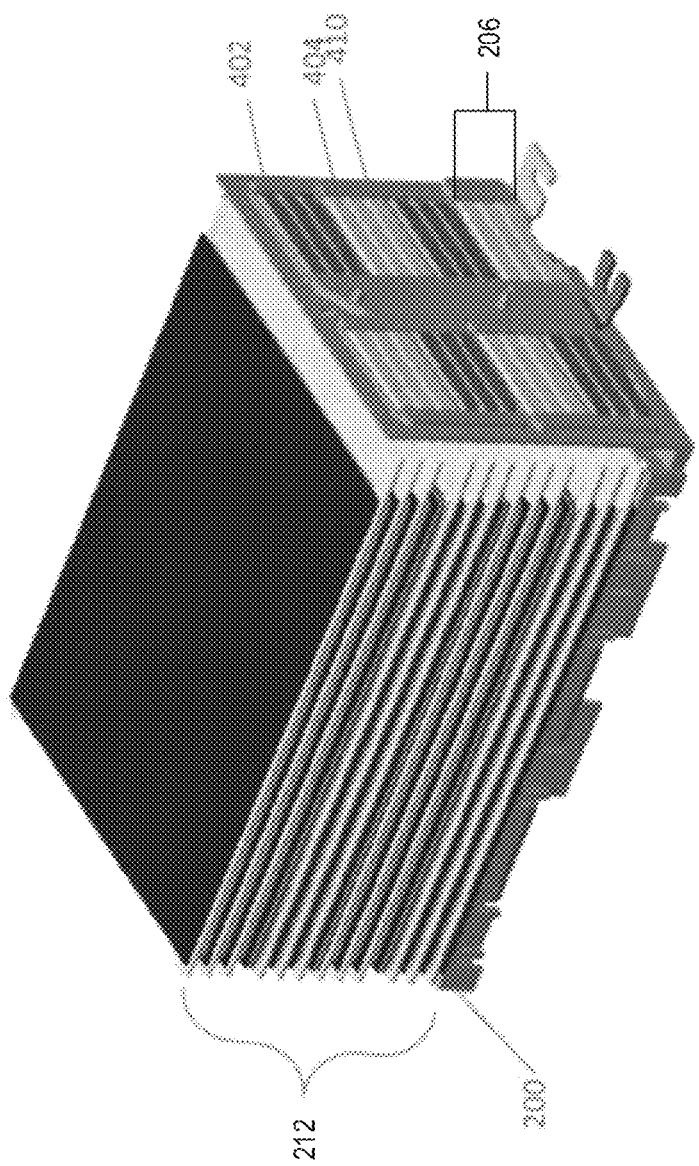
FIG. 10 is a perspective view of the battery cell terminals bent over the weld fingers of the lower bus bar assembly.

FIG. 10 is a perspective view of the battery cell array 212 arranged with the battery cell terminals 402 and 404 folded over the isolated weld fingers 702 of the lower bus bar 414. Thus, in FIG. 10, the folded battery cell terminals 402 and 404 may be covering the isolated weld fingers 702 from view.

FIGS. 11-24 depict four configurations for welding and securing the battery cell terminals 402 and 404 to the lower bus bar 414. FIGS. 11-17 depict a configuration for assembly and welding of the battery cell terminals 402 and 404 in which the battery cell terminals 402 and 404 are sandwiched between the isolated weld fingers 702 of the lower bus bar 414 and an upper bus bar assembly 415 consisting of one or more upper bus bars 416 and a flex circuit 418 that are physically coupled to one another prior to welding. The welding configuration depicted in FIG. 18 uses the same assembly as described in the method of FIGS. 11-17 except that the upper bus bars 416 and flex circuit 418 are physically separate prior to welding. FIGS. 19-24 depict two additional configurations for the assembly and welding of the battery cell terminals to the isolated weld fingers 702. The plurality of weld fingers 702 serve as the members to which the battery cell terminals are welded. In one embodiment (FIG. 22) the flex circuit 418 is attached to the isolated weld fingers 702 independently of the upper bus bars 416, and in the other embodiment (FIG. 23) upper bus bars 416 are not used at all. Each configuration for the assembly and welding of the battery cell terminals 402 and 404, lower and upper bus bars 414 and 416 respectively, and flex circuit 418 may be more or less cost effective depending on the particular specifications of the starter battery 100 being manufactured.

Figure 11:
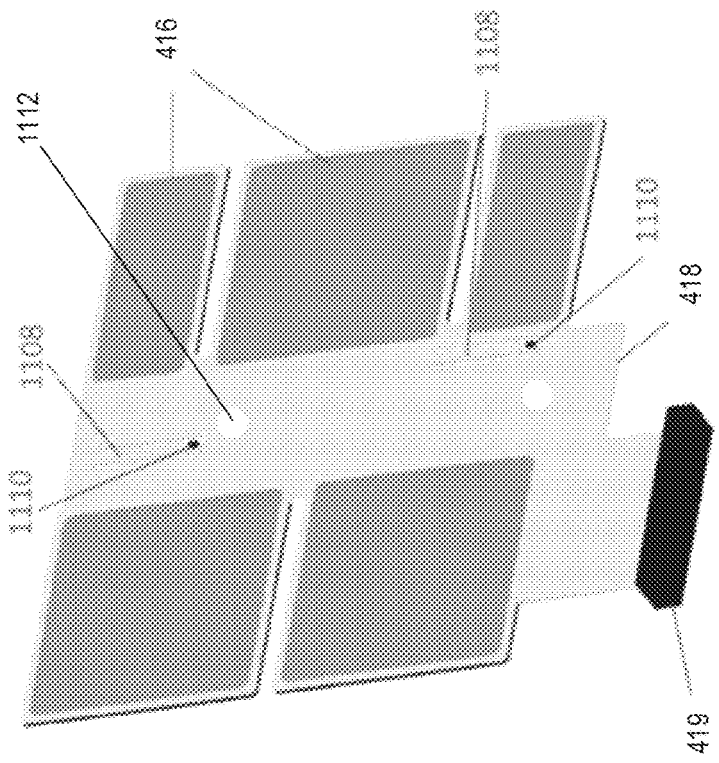
FIG. 11 is a perspective view of an upper bus bar assembly.

FIG. 11 is a perspective view the upper bus bar assembly 415 comprising both the flex circuit 418 and one or more upper bus bars 416. The flex circuit 418 and upper bus bars 416 may be pre-assembled and may be physically coupled together as one cohesive structure that may then be welded to the lower bus bar 414 as described further in FIG. 15. In an alternate embodiment, described in FIG. 18, the flex circuit 418 and upper bus bars 416 may be distinct structures that are welded together at the time of the welding of the battery cell terminals to the lower bus bar 414. In the present embodiment where the flex circuit 418 and upper bus bars 416 are pre-assembled as one structure into an integrated upper bus bar assembly 415, the flex circuit 418 and the upper bus bars 416 may be a similar thickness. In one embodiment the flex circuit 418 may be the same thickness as the upper bus bars 416. In another embodiment the flex circuit 418 may be thicker than the upper bus bars 416. In another embodiment the upper bus bars 416 may be thicker than the flex circuit 418. The upper bus bars 416 may carry all or part of the current between the parallel cell groups 206. The flex circuit 418 may route electrical signals to a connector 419. Further, the upper bus bars 416 and the flex circuit 418 may be electrically coupled to one another and capable of carrying current between one another. The upper bus bars 416 may be electrically connected to the battery cell terminals 402 and 404 and may be welded to the battery cell terminals 402 and 404 and the lower bus bar 414. Thus, upper bus bars 416 may be physically and electrically coupled to the flex circuit 418 to help carry electricity between battery cell terminals 402 and 404 connected therewith and to carry electricity to the connector 419. The upper bus bars 416 may provide an electrical connection, and may be made from a single metal, coated or plated metal, a bi-metallic member, or other electrically conductive item that is capable of being electrically connected with the battery cell terminals 402 and 404 and the lower bus bar 414. The flex circuit 418 defines one or more tabs 1108 sized and configured to electrically connect a thermistor 1110, or other electric or electric-mechanical device to the electrical connector 419. The shape of the tab 1108 is configured to allow the thermistor 1110 to be routed to a location within the cell array 212 to measure a characteristic of the starter battery 100, or of individual battery cells 202, or of a group of battery cells 202 (e.g. cell group 206). Specifically, the tabs 1108 may be of a similar thickness to that of the flex circuit 418. In one embodiment the tabs 1108 may be the same thickness as the flex circuit 418. In another embodiment the tabs 1108 may be thinner than the flex circuit 418. In yet another embodiment, the tabs 1108 may be thicker than the flex circuit 418. The tabs 1108 may be long, slender and rectangular in shape. The tabs 1108 may be physically coupled to the to the flex circuit 418 by a pivoting joint at of their short ends. The thermistor 1110 may be located at the opposite end of the tabs 1108. Thus, the tabs 1108 may swing inwards towards the battery cells 202 so that at least the portion of the tab 1108 including the thermistor 1110 may rest inside the cell array 212 and contact one of the battery cells 202. The flex circuit 418 may further comprise several circular openings 1112. The circular openings 1112 may fit over the alignment devices 710 of the lower bus bar assembly 410 to assist in the alignment of the upper bus bar assembly 415 with the battery cell terminals 402 and 404, and the lower bus bar 414.

Figure 12:
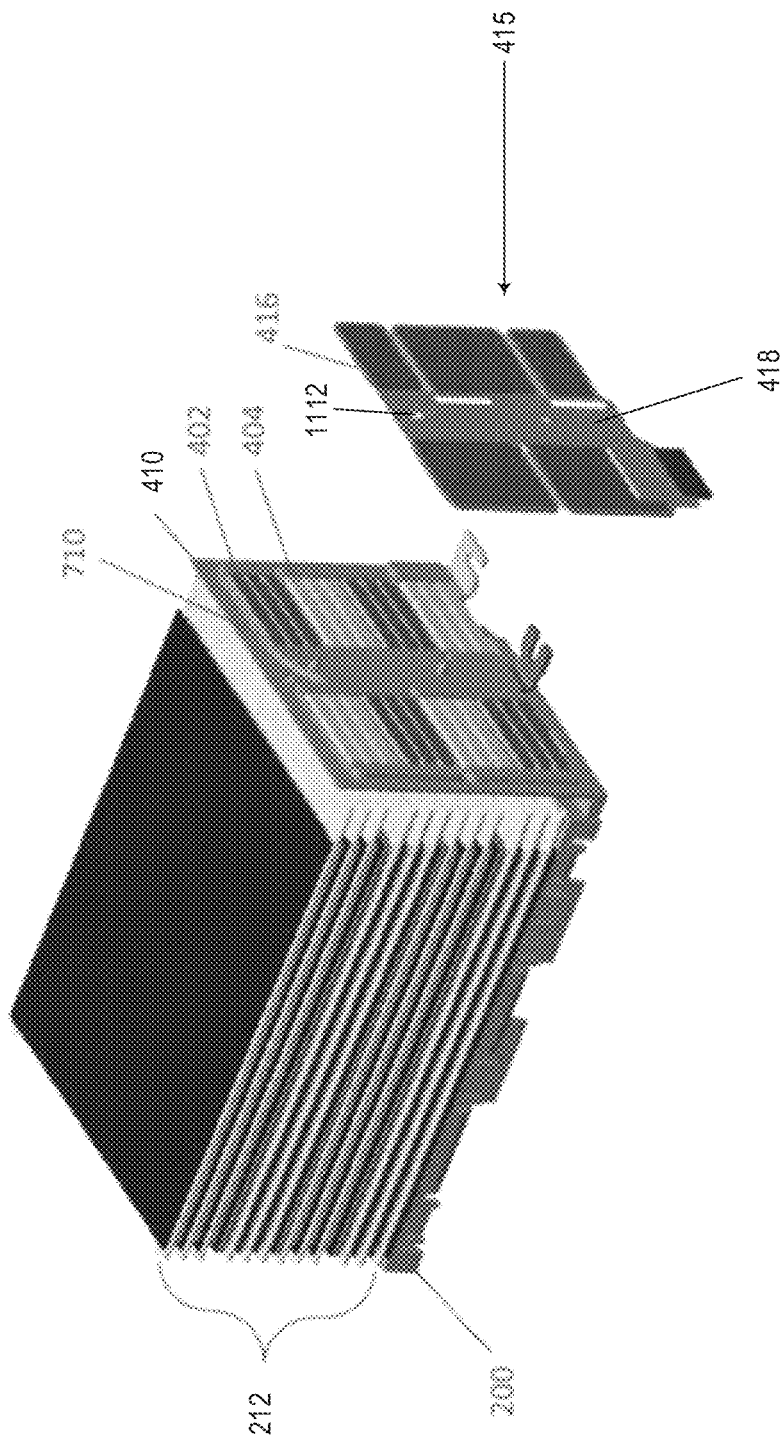
FIG. 12 is a perspective view of the assembly of FIG. 10 aligned with the upper bus bar assembly.

FIG. 12 is a perspective view of the upper bus bar assembly 415 aligned with the battery cell array 212, compression plate 200, and lower bus bar assembly 410. As described in FIG. 10, the battery cell array 212 may be fixed atop the compression plate 200, with battery cell terminals 402 and 404 protruding through the lower bus bar assembly 410 and folded over onto the lower bus bar 414. The upper bus bar assembly 415 may be one cohesive structure comprising a flex circuit 418 and one or more upper bus bars 416 as described in the embodiment in FIG. 11. The lower bus bar assembly 410 may be physically coupled to the battery cell compression plate 200 as described in FIG. 9. The alignment devices 710 are configured to lodge inside the circular openings 1112 of the flex circuit 418 to align the lower bus bar assembly 410 with the upper bus bar assembly 415 such that battery cell terminals 402 and 404 are sandwiched between the lower bus bar 414 and the upper bus bars 416. Thus, the upper bus bar assembly 415 may be aligned with the lower bus bar assembly 410 so that the upper bus bars 416 overlay the bent battery cell terminals 402 and 404 while the flex circuit 418 may overlay the center support structure of the lower bus bar 414.

Figure 13:
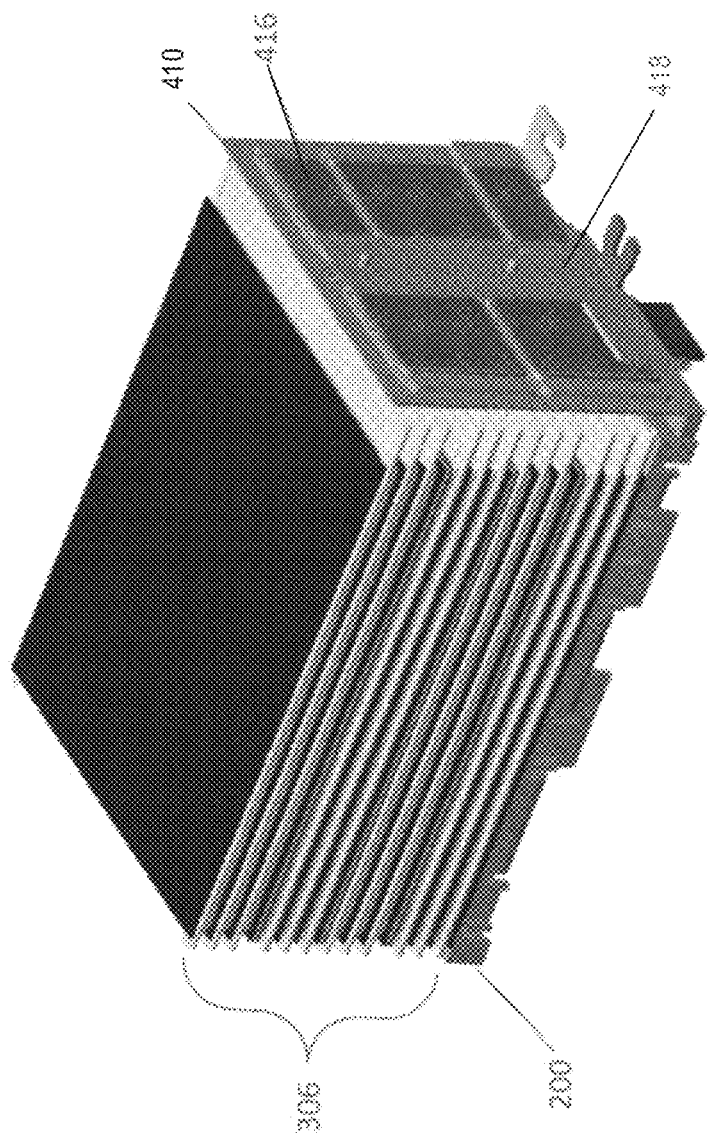
FIG. 13 is a perspective assembly view of the assembly of FIG. 10 with the upper bus bar assembly attached thereto.

FIG. 13 is a perspective view of the battery cell array 212 and compression plate 200 positioned to have the upper bus bar assembly 415, the battery cell terminals 402 and 404, and the lower bus bar 414 welded, where the upper bus bar assembly 415 may be one coherent unit comprising a flex circuit 418 and one or more upper bus bars 416. The lower bus bar 414 may not be visible in FIG. 13 as it is covered by the upper bus bar assembly 415. Thus, as described in greater detail in FIG. 16, the upper bus bar assembly 415, battery cell terminals 402 and 404, and lower bus bar 414 may be welded together in a three layer sandwich arrangement, with the battery cell terminals 402 and 404 being positioned between the lower bus bar 414 and the upper bus bar assembly 415.

The battery cell terminals 402 and 404 may be electrically coupled to the upper bus bar assembly 415 and/or the lower bus bar 414. Thus, the starter battery 100 current may be carried by the lower bus bar 414, or the upper bus bar assembly 415, or a combination of both the lower bus bar 414 and the upper bus bar assembly 415.

Figure 14:
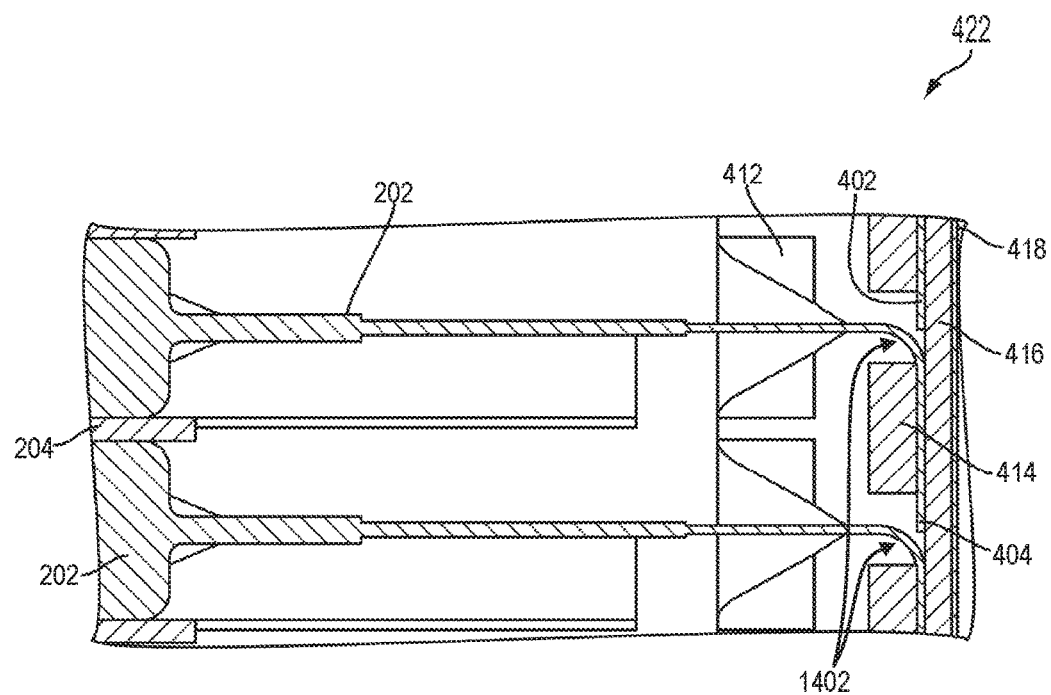
FIGS. 14 and 15 are side views, in cross-section, of portions of the cell array in the assembly arrangement of FIG. 13 before and after welding respectively.

FIG. 14 is a cross sectional view of part of one of the stacked cell terminal columns 608 comprising battery cell terminals 402 and 404 sandwiched between the lower bus bar 414 and the upper bus bars 416. The battery cell terminals 402 and 404 extend away from the battery cells 202 of the cell array 212, may protrude through the lower bus bar support frame 412, and then may be bent with a bend radius 1402 so that the ends of the cell terminals 402 and 404 may lie flat against the side of lower bus bar 414 nearer the upper bus bar assembly 415. Thus, the battery cell terminals are bent over the isolated weld fingers 702 as shown in FIG. 10, such that ends of the battery cells terminals lie coincident with the surface of the weld fingers 702. The battery cell terminals 402 and 404 are sandwiched between the weld fingers 702 and the upper bus bar assembly 415 such that the weld fingers 702 contact the side of the battery cell terminals 402 and 404 facing the cell array 212, while the upper bus bar assembly 415 contacts the opposite side of the battery cell terminals 402 and 404. The bend radius 1402 relieves or minimizes the residual forces (compressive and tensile) acting within the battery cell terminals 402 and 404 that result from the bending operation which would otherwise act to spring the battery cell terminals 402 and 404 away from the lower bus bar 414. The bend radius 1402 also acts to reduce the concentration of stresses in the area of the bend. FIG. 14 further depicts the battery cell terminals 402 and 404 as thinner than the isolated weld fingers 702 and the upper bus bars 416. However it should be appreciated that in other embodiment, the battery cell terminals 402 and 404 may be the same thickness or a greater thickness than the upper bus bars 416 and isolated weld fingers 702. When the battery cell terminals 402 and 404 are thinner than the isolated weld fingers 702 as depicted, welding the cell terminals 402 and 404 to the isolated weld fingers 702 using the upper bus bar assembly 415 may be advantageous because the upper bus bar assembly 415 may mitigate damage to the cell terminals 402 and 404 from excessive heat during welding.

Figure 15:
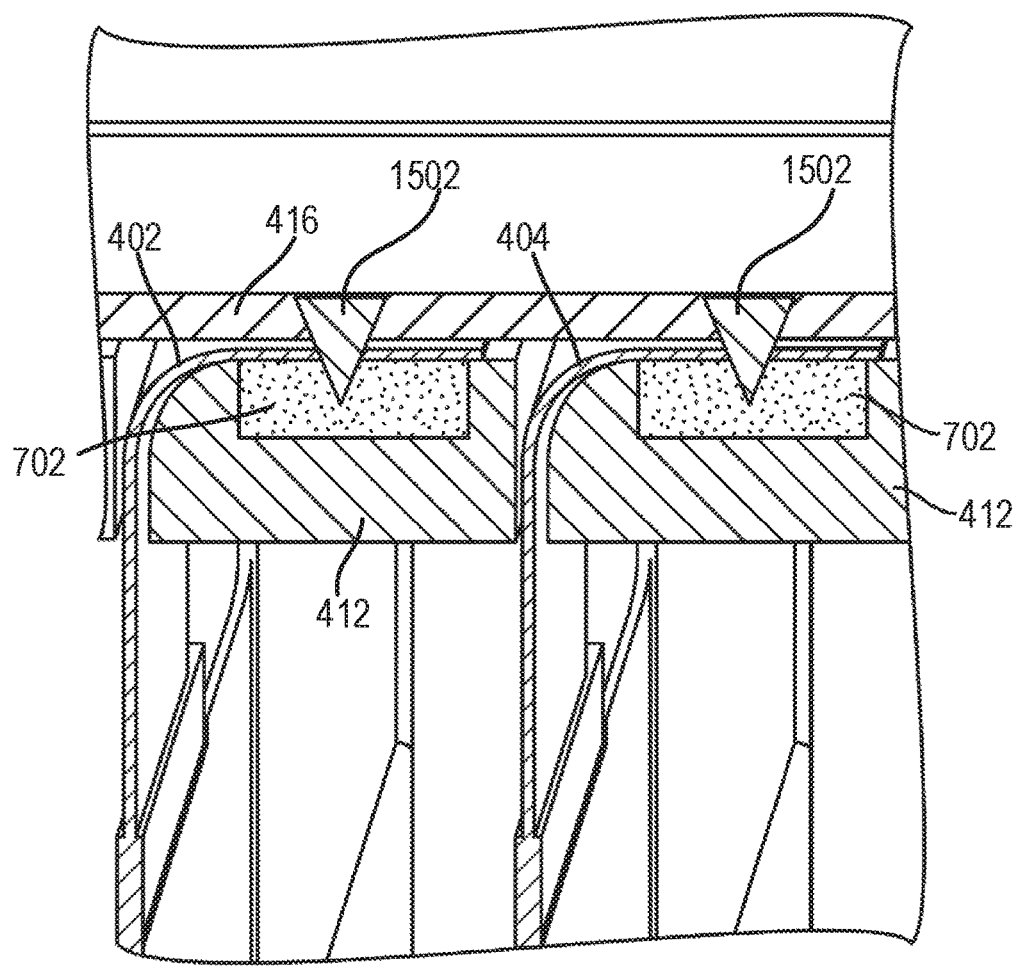

FIG. 15 is a cross sectional view of the welds 1502 that hold the battery cell terminals 402 and 404, lower bus bar 414, and the upper bus bar assembly 415 together in the three layer sandwich arrangement described earlier in FIG. 14. The battery cell terminals 402 and 404 may be bent along the bend radius 1402 and are sandwiched between the lower bus bar 414 and the upper bus bar assembly 415. The sandwiched components can be welded starting at the upper bus bars 416 which may penetrate through the battery cell terminals 402 and 404, and a distance into the lower bus bar 414. However the welds may be restricted to specific locations on the upper bus bar assembly 415 where both one of the cell terminals 402 or 404, and one of the weld fingers 702 lay beneath the upper bus bar assembly 415. As shown in FIG. 15 and described earlier with reference to FIG. 7, the isolated weld fingers 702 are not continuous. There are slits 420 in each isolated weld finger 702 and there are spaces between the series weld fingers 706 and the parallel weld fingers 708. Each individual isolated weld finger 702 of the lower bus bar 414 is fastened in the support frame 412. In one embodiment the weld fingers 702 are directly physically coupled to the support frame 412 without any additional component separating the weld fingers 702 from the support frame 412. Welding the battery cell terminals 402 and 404 to the lower bus bar 414 with the aid of the upper bus bar assembly 415 may mitigate damage to the battery cell terminals 402 and 404. If the battery cell terminals 402 and 404 are made from thin materials direct, welding of the battery cell terminals 402 and 404 to the lower bus bar 414 without the upper bus bar assembly 415 requires a more precise and narrow process window to avoid excessive heat that can cause distortion of the parts or actually cut through the battery cell terminals 402 and 404. Likewise, direct welding of the cell terminals 402 and 404 to the upper bus bars 416 without the lower bus bar 414 requires a more precise and narrow process window to avoid excessive heat that can cause distortion of the parts or actually cut through the thin cell terminals 402 and 404. Direct welding also requires extensive fixturing to hold the parts in intimate contact with each other to avoid destroying the thin battery cell terminals 402 and 404.

Sandwiching the cell terminals 402 and 404 between the lower bus bar 414 and upper bus bar assembly reduces the sensitivity of the weld process to air gaps between the cell terminals 402 and 404, the isolated weld fingers 702, and upper bus bar assembly 415. It also enables improved welding of dissimilar material. Other advantages include increased connection area between the weld fingers 702, cell terminals 402 and 404, and upper bus bar assembly 415. The use of the upper bus bar assembly 415 may also provide a secondary conductive path to carry current. Using the three layer sandwich arrangement of the weld fingers 702, cell terminals 402 and 404, and upper bus bar assembly 415 may result in enhanced mechanical robustness as compared to direct welding of the battery cell terminals 402 and 404 to a single bus bar.

Figure 16:
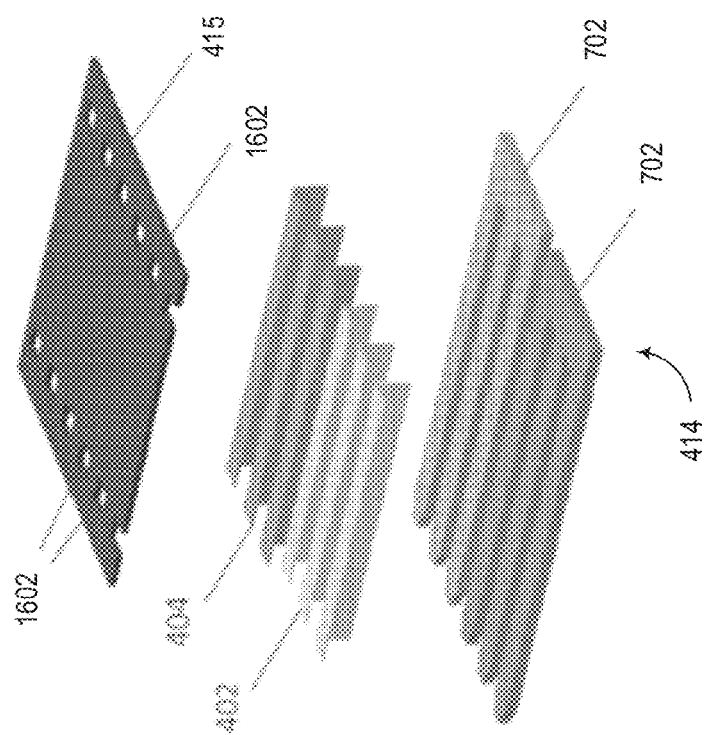
FIG. 16 is an exploded perspective view of upper bus bars, bent cell tabs, and weld fingers in the assembly arrangement of FIG. 14.

FIG. 16 is a perspective exploded view of the three layer sandwich arrangement of the upper bus bar assembly 415, battery cell terminals 402 and 404, and lower bus bar 414. The upper bus bar assembly 415 may include openings 1602 positioned to allow a visual inspection of the battery cell terminals 402 and 404 welded to the weld fingers 702.

Figure 17:
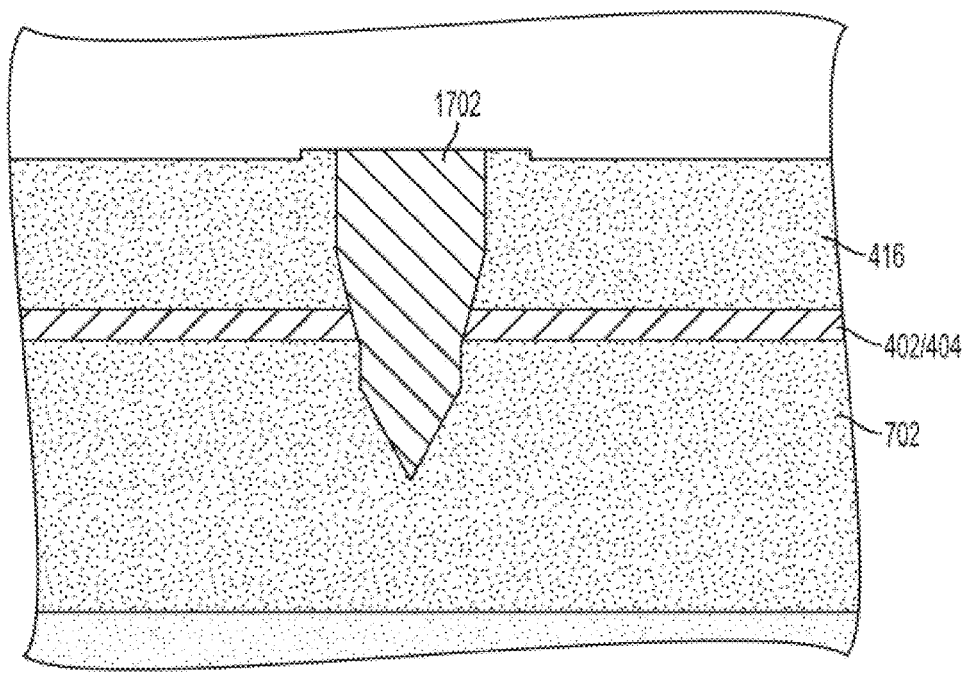
FIG. 17 is a side view, in cross-section, sectional view of one of the welds of FIG. 15.

FIG. 17 is a cross sectional view of a weld 1702, which penetrates through the upper bus bar assembly 415, the battery cell terminals 402 or 404 and into the lower bus bar 414. This figure illustrates how, for example, a laser beam directed at the upper bus bar assembly 415 may selectively melt a portion of the upper bus bar assembly 415, the cell terminals 402 and 404 and the lower bus bar weld fingers 702. If the lower bus bar weld fingers 702 are not used, the material from the battery cell terminals 402 and 404 may pool or blow through, reducing the mechanical and electrical quality and reliability of the weld 1702. The use of the lower bus bar weld fingers 702 maintains the integrity of the cell terminals 402 and 404 by providing sacrificial material to be melted with the upper bus bar assembly 415 and battery terminals 402 and 404.

To maintain the integrity of the weld 1702 when welding a battery terminal 402 or 404 made out of copper (Cu), it may be desirable to use the same or a similar material, Cu for example for a bus bar. Therefore, the negative battery cell terminal 402 may be made from Cu. If the positive battery cell terminal 404 is made of aluminum (Al), a bus bar made of Al may be desirable. This may create a problem when a bus bar is connecting battery cells 202 in series as the Cu anode would be connected to an Al cathode tab, which would require a bi-metallic bus bar so that the Cu tabs would be welded to the Cu portion of the bi-metallic bus bar, and the Al tabs would be connected to the Al portion of the bi-metallic bus bar. The use of lower bus bar 414 allows heat to be more evenly transferred and provides sacrificial material from the lower bus bar 414 to be used to join dissimilar metals. The three layer sandwiched configuration of lower bus bar 414, battery cell terminals 402 and 404, and upper bus bar assembly 415, allows the upper bus bars 416 and lower bus bar 414 to be made from a single material, element or metal similar or dissimilar from the battery cell terminal 402 and 404 material.

Figure 18:
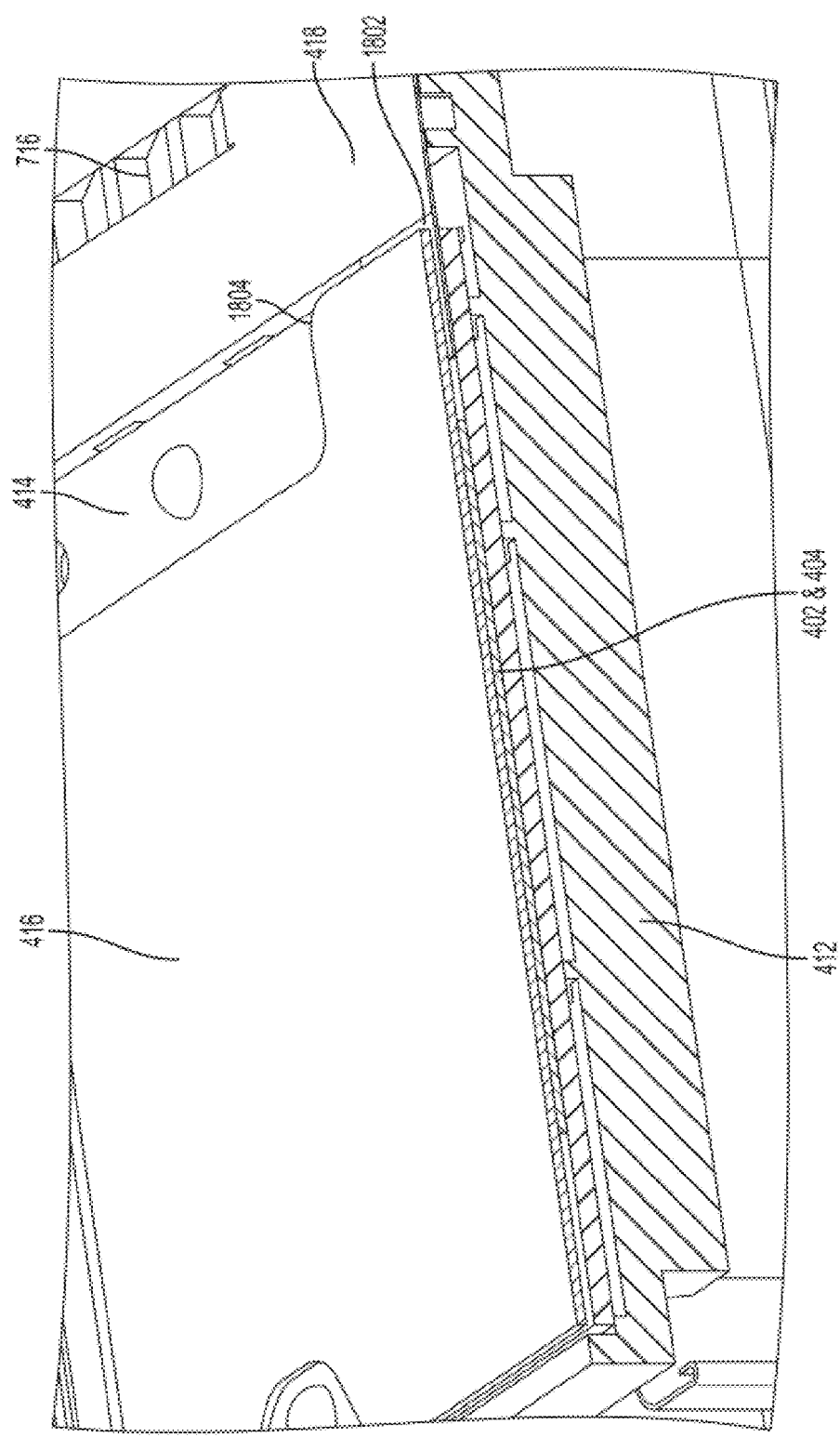
FIG. 18 is a side view in cross-section of an assembly arrangement for the lower bus bar, battery cell terminals, upper bus bars, and a flex circuit.

FIG. 18 is a side view of an alternate embodiment to the three layer sandwich arrangement of lower bus bar 414, battery cell terminals 402 and 404, and upper bus bar assembly 415 described in FIGS. 11-17. The arrangement of the isolated weld fingers 702, cell terminals 402 and 404, and upper bus bar assembly 415 may be the same as the arrangement described in FIGS. 11-17 with the battery cell terminals 402 and 404 being positioned between the weld fingers 702 and the upper bus bar assembly 415. Additionally, the electrical connections between the battery cells 202, lower bus bar 414 and upper bus bar 416 may be similar to those in FIG. 13. The lower bus bar 414 and/or upper bus bars 416 may be electrically connected to the battery cell terminals 402 and 404. Thus, the electrical current of the battery cells 202 may be carried by either the upper bus bars 416 or the lower bus bar 414, or a combination of both the upper bus bars 416 and lower bus bar 414. However, in the present embodiment, the upper bus bars 416, and the flex circuit 418 are distinct structures that are not fixedly attached as one cohesive upper bus bar assembly 415 prior to welding of the battery cell terminals 402 and 404 to the isolated weld fingers 702. For a greater description of the structure and function of the flex circuit 418 see FIG. 19. As such the welding configurations of the upper bus bars 416, battery cell terminals 402 and 404, and lower bus bar 414 may be slightly different from that described in FIG. 15.

Welds may be used to secure the upper bus bars 416 to the flex circuit 418 and the lower bus bar 414 in addition to the welds securing the upper bus bars 416 with the battery cell terminals 402 and 404 and the lower bus bar 414. Specifically, the upper bus bars 416 may have one or more upper bus bar flanges 1804 that overlap with sense tabs 1802 of the flex circuit 418. Just as in the three layer sandwich method described in FIGS. 11-17, upper bus bars 416 may lie on top of the cell terminals 402 and 404 folded over the weld fingers 702. The upper bus bars 416, battery cell terminals 402 and 404, and lower bus bar 414 may be welded together at one of more of the cell terminals 402 and 404. In order to secure the flex circuit 418 to the weld fingers 702, the present method may include additional welds at one or more of the upper bus bar flanges 1804. Thus, the upper bus bar flanges 1804 may be welded with the flex circuit sense tabs 1802 and lower bus bar 414 to secure the flex circuit 418 to the lower bus bar 414. The position of the flex circuit 418 relative to the upper bus bars 416 may be the same whether or not the flex circuit 418 is fixedly attached to the upper bus bar 416. Thus, the flex circuit 418 may be positioned between the upper bus bars 416 and may overlay the center support structure 716 just as described in the positioning of the upper bus bar assembly 415 in FIGS. 12 and 13. In the present embodiment, the flex circuit 418 may include several sense tabs 1802 which may be configured to carry the electrical sensing current between the upper bus bars 416 and/or battery cells 202, and/or to carry a cell balancing current used to ensure an even state of charge between parallel cell groups 206. The lower bus bar support structure 412 is shown attached to the lower bus bar 414.

FIG. 18 depicts another embodiment of a welding arrangement of a lower bus bar 414, cell terminals 402 and 404, and an upper bus bar assembly 415 where the upper bus bar assembly 415 comprises a flex circuit 418 that is physically separate from two upper bus bars 416.

Figure 19:
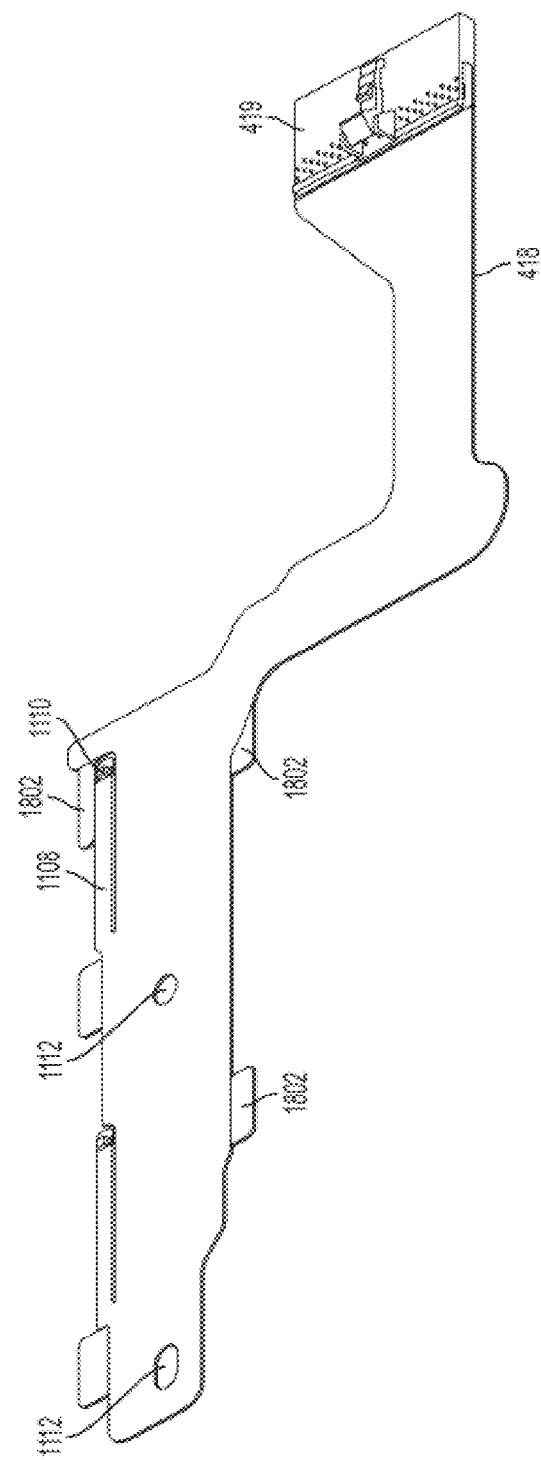
FIG. 19 is a perspective view of the flex circuit.

FIG. 19 is a perspective view of the flex circuit 418. As described above with reference to FIG. 11, the flex circuit 418 may comprise several circular openings 1112, tabs 1108, thermistors 1110, and an electrical connector 419. The circular openings 1112 may fit over the alignment devices 710 of the lower bus bar assembly 410 to assist in the alignment of the flex circuit 418 with the battery cell terminals 402 and 404, and the lower bus bar 414. The tabs 1108 may be sized and configured to electrically connect a thermistor 1110, or other electric or electric-mechanical device to the electrical connector 419. The shape of the tab 1108 may be configured to allow the thermistor 1110 to be routed to a location within the cell array 212 to measure characteristics of the starter battery 100, or of individual battery cells 202, or of a group of battery cells 202 (e.g. cell group 206). Specifically, the tabs 1108 may be of a similar thickness to that of the flex circuit 418. In one embodiment, the tabs 1108 may be the same thickness as the flex circuit 418. In another embodiment the tabs 1108 may be thinner than the flex circuit 418. In yet another embodiment, the tabs 1108 may be thicker than the flex circuit 418. The tabs 1108 may be long, slender and rectangular in shape. The tabs 1108 may be physically coupled to the to the flex circuit 418 by a pivoting joint at of their short ends. A thermistor 1110 may be located at the opposite end of the tabs 1108. Thus, the tabs 1108 may swing inwards towards the battery cells 202 so that at least the portion of the tab 1108 including the thermistor 1110 may rest inside the cell array 212 and contact one of the battery cells 202. The size and shape of the tabs 1108 can be configured as to provide further advantages for the design. The flex circuit 418 may additionally comprise several sense tabs 1802. The sense tabs 1802 may be secured to the lower bus bar 414 through any one of several joining methods (e.g. ultrasonic welding, laser welding, resistance welding, etc.). The sense tabs 1802 may be electrically coupled to the battery cell terminals 402 and 404. As such, the sense tabs 1802 may be carry an electrical sensing current and/or cell balancing current between the upper bus bars 416 and/or cell terminals 402 and 404 and the electrical connector 419. Specifically, the flex circuit 418 may route electrical signals to a connector 419 which may be routed to a battery management system (not shown) to monitor the voltages of the battery cells 202. A battery management system (not shown) may in turn shut off the starter battery 100 if the voltages of any one of the battery cells 202 exceed a pre-set threshold that may lead to battery degradation.

Figure 20:
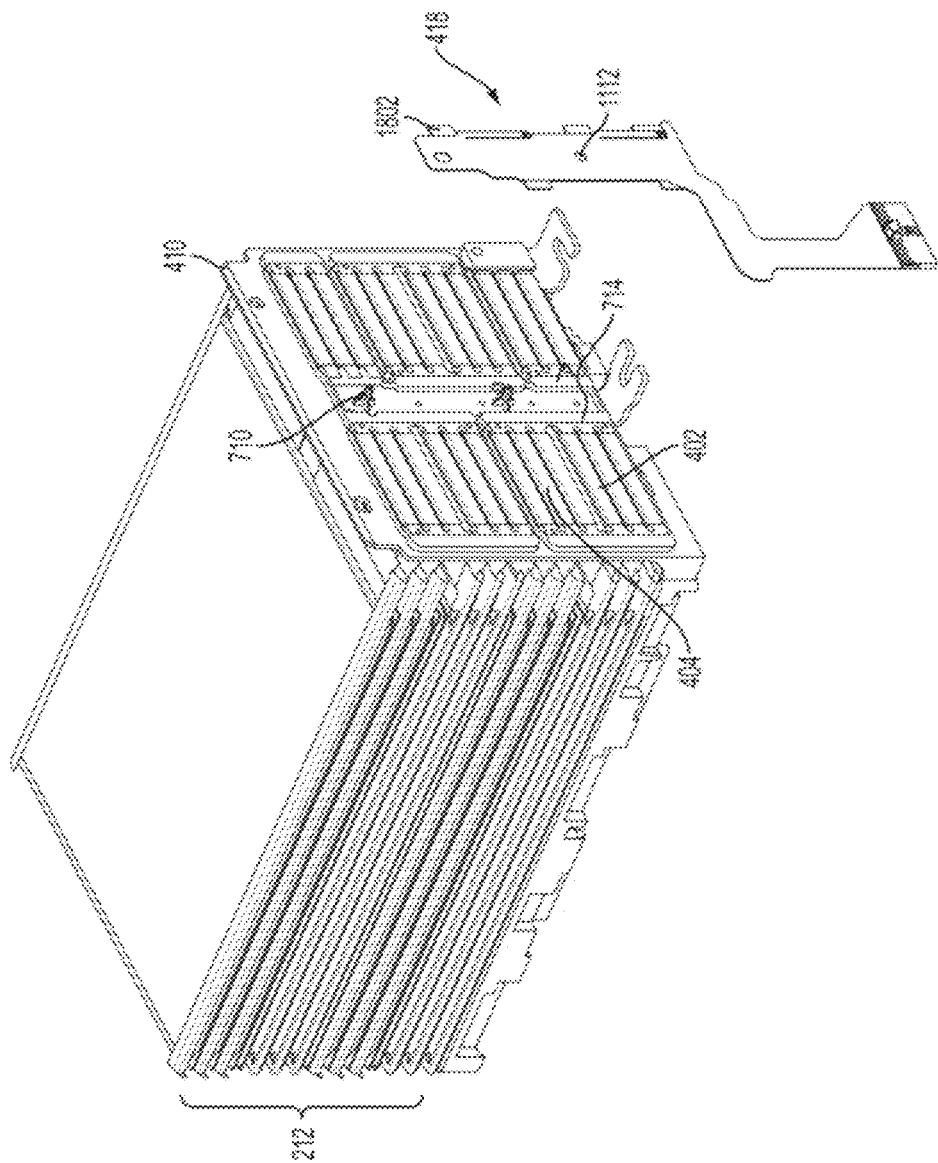
FIG. 20 is a perspective view of the assembly of FIG. 10 aligned with the flex circuit.

FIG. 20 shows the flex circuit 418 aligned with the end of cell array 212 physically coupled to the lower bus bar assembly 410. The alignment devices 710 of the lower bus bar assembly 410 may fit into the circular openings 1112 of the flex circuit 418, to align the flex circuit 418 with the lower bus bar assembly 410. The flex circuit 418 may be sized and aligned to overlay the center support section 714, such that the sense tabs 1802 may overlap with the battery cell terminals 402 and 404 and be electrically connected thereto.

Figure 21:
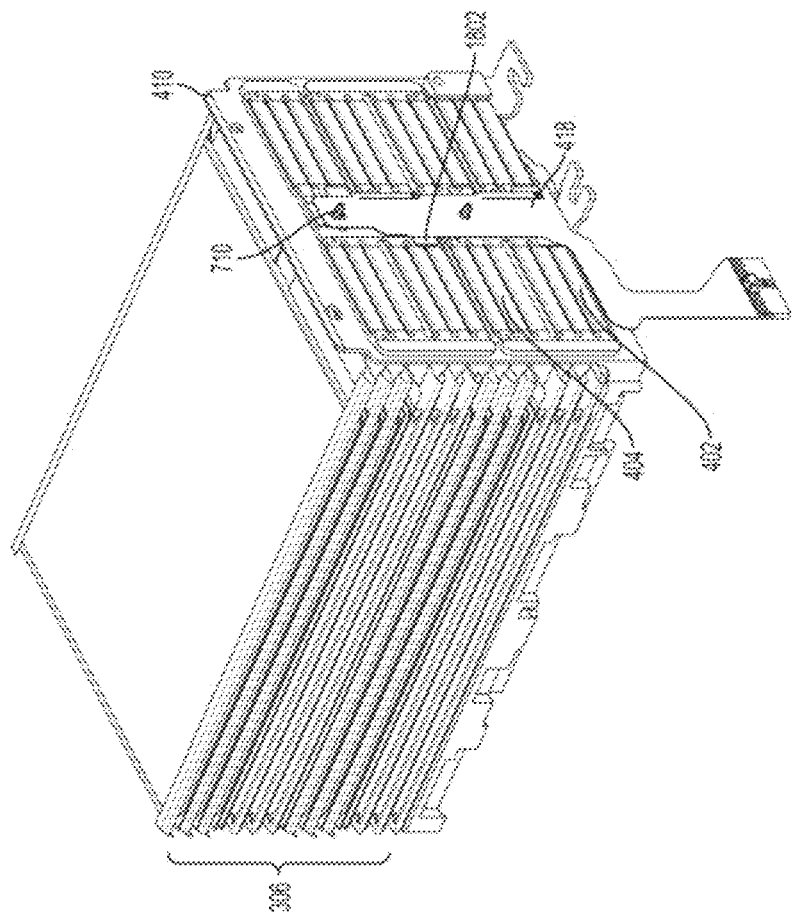
FIG. 21 is a perspective assembly view of the assembly of FIG. 10 with flex circuit attached thereto.

In FIG. 21, the flex circuit 418 is shown physically connected to the lower bus bar assembly 410. The alignment devices 710 may protrude through the circular openings 1112 of the flex circuit 418. The sense tabs 1802 may be electrically connected to the battery cell terminals 402 and 404 and may provide an electrical connection between battery cell terminals 402 and 404 and the electrical connector 419 to carry the electrical sensing current and/or cell balancing current.

Figure 22:
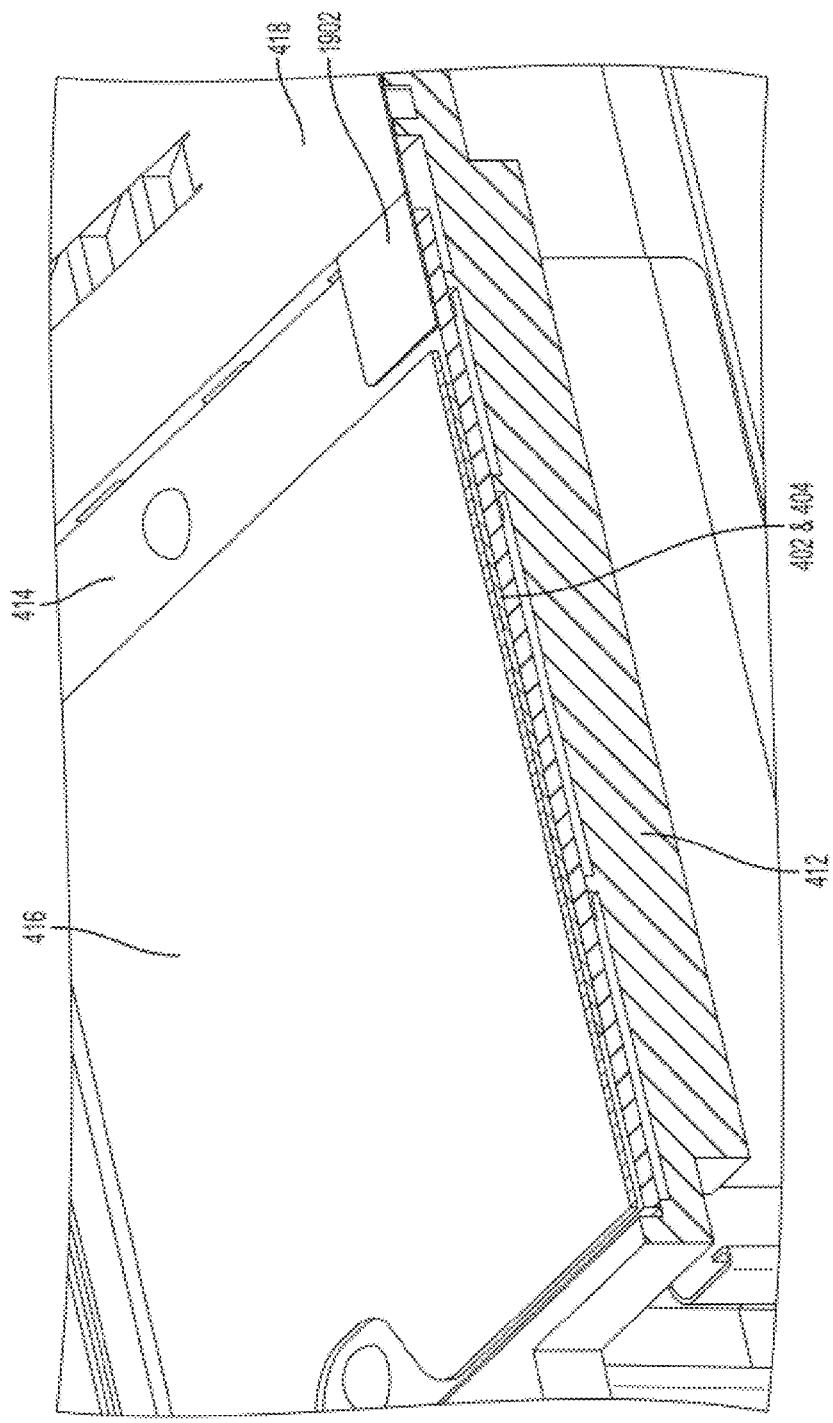
FIG. 22 is a side view in cross-section of an alternate embodiment of the assembly arrangement of FIG. 18.
Figure 23:
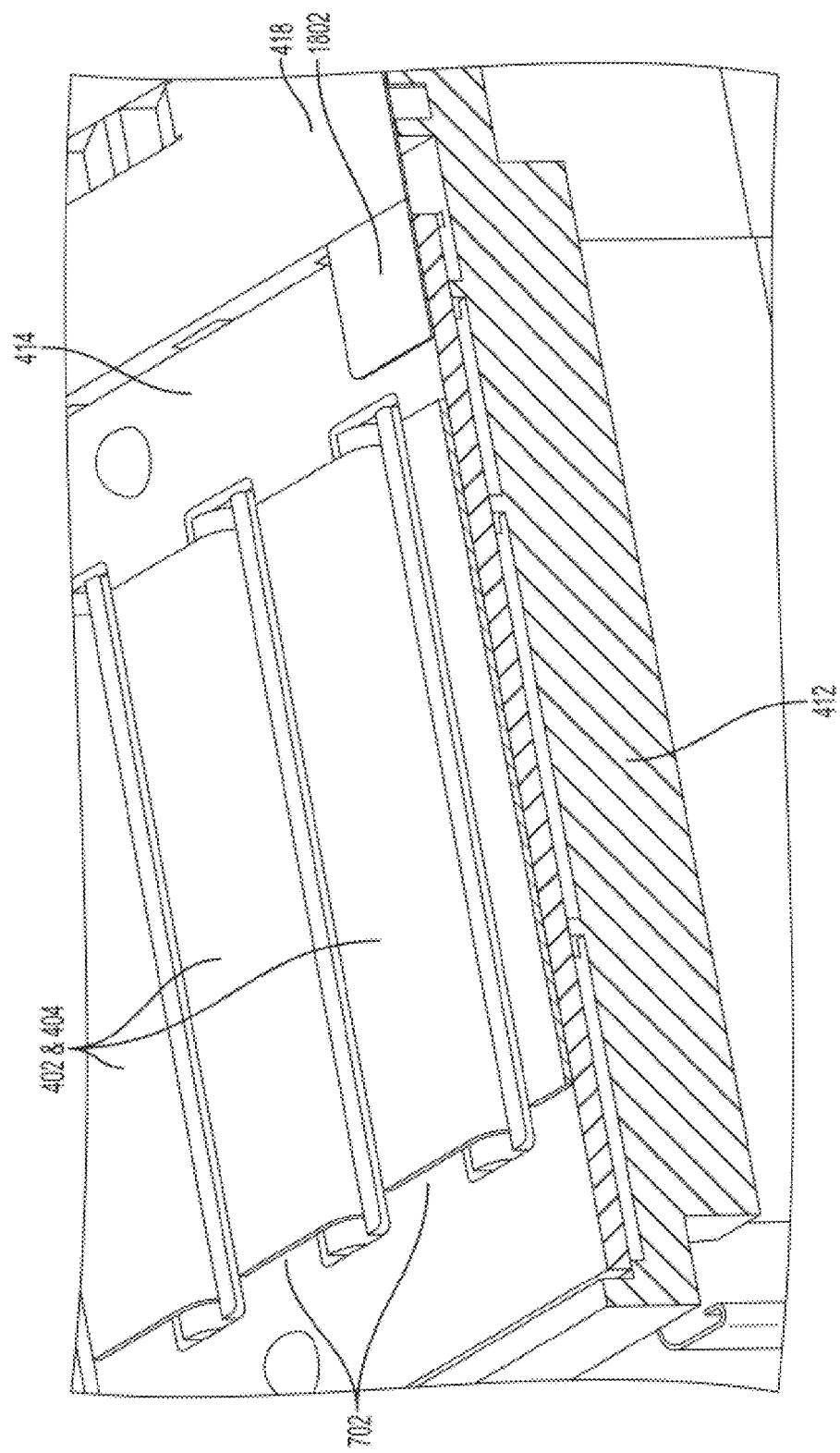
FIG. 23 is a side view in cross-section of an assembly arrangement for the lower bus bar, battery cell terminals, and flex circuit.

FIGS. 22 and 23 depict two additional welding configurations for securing the battery cell terminals 402 and 404 to the isolated weld fingers 702 of the lower bus bar 414. In both of these configurations the flex circuit 418 may be physically attached to the lower bus bar 414 as described above in FIGS. 20 and 21. Additionally, the flex circuit may be sized and electrically coupled with the battery cell terminals 402 and 404 to carry only the electrical sensing current and cell balancing current as described in FIG. 4. In both of the welding configurations described in FIGS. 22 and 23, the battery cell terminals 402 and 404 may be electrically coupled to the lower bus bar 414. As such, the lower bus bar 414 may carry current between the battery cell terminals 402 and 404 in the welding configurations described in FIGS. 22 and 23. Thus, the lower bus bar 414 may carry a portion or all of the current between the parallel cell groups 206. A portion or all of the starter battery 100 current may also be carried by the upper bus bars 416.

FIG. 22 shows a side perspective view of an assembly and welding configuration for securing the battery cell terminals 402 and 404 to the lower bus bar 414 using freestanding upper bus bars 416. Just as in FIG. 18, the one or more upper bus bars 416 may lie over and cover the battery cell terminals 402 and 404. The difference between the current configurations and that described in FIG. 18, is that the upper bus bars 416 in the current configurations may not include flanges 1804 that overlap with the sense tabs 1802 of the flex circuit 418. Thus, in the current configuration, the flex circuit sense tabs 1802 may be attached directly to the lower bus bar 414 without the use of the upper bus bars 416 as described in FIG. 21 through welding or other joining method. The battery cell terminals 402 and 404 may be folded over isolated weld fingers 702 (not shown) of the lower bus bar 414. The lower bus bar 414 itself may be retained in the lower bus bar support structure 412. It is important to note that FIG. 22 only depicts one of the upper bus bars 416. There may be one or more upper bus bars 416, on either side of the flex circuit 418, so as so to cover all of the battery cell terminals 402 and 404.

FIG. 23 depicts a side perspective view of another configuration for welding the battery cell terminals 402 and 404 to the lower bus bar 414. As shown in FIG. 23, upper bus bars 416 may not be used. As such, the lower bus bar 414 may carry all of the current between the battery cells 202. The battery cell terminals 402 and 404 may be folded over the isolated weld fingers 702 of the lower bus bar 414 and may be directly welded to the lower bus bar 414. The battery cell terminals 402 and 404 may be sufficiently thick such that they may provide sacrificial material to be used in welding the battery cell terminals 402 and 404 to the lower bus bar 414. Thus, the thickness of the battery cell terminals 402 and 404 may be sufficient to mitigate damage to the battery cell terminals 402 and 404 and the battery cells 202 due to excessive heat during welding. The flex circuit 418 may be physically attached to the lower bus bar 414 through welding or other joining method of the sense tabs 1802 to the lower bus bar 414 as described in FIG. 21. The lower bus bar 414 may be retained in the support frame 412. It is important to note that FIG. 23 only depicts a portion of all the battery cell terminals 402 and 404. There may be additional battery cell terminals 402 and 404 aligned with those shown in FIG. 23. Additionally, there may be other battery cell terminals 402 and 404 aligned on the opposite side of the flex circuit 418.

Figure 24:
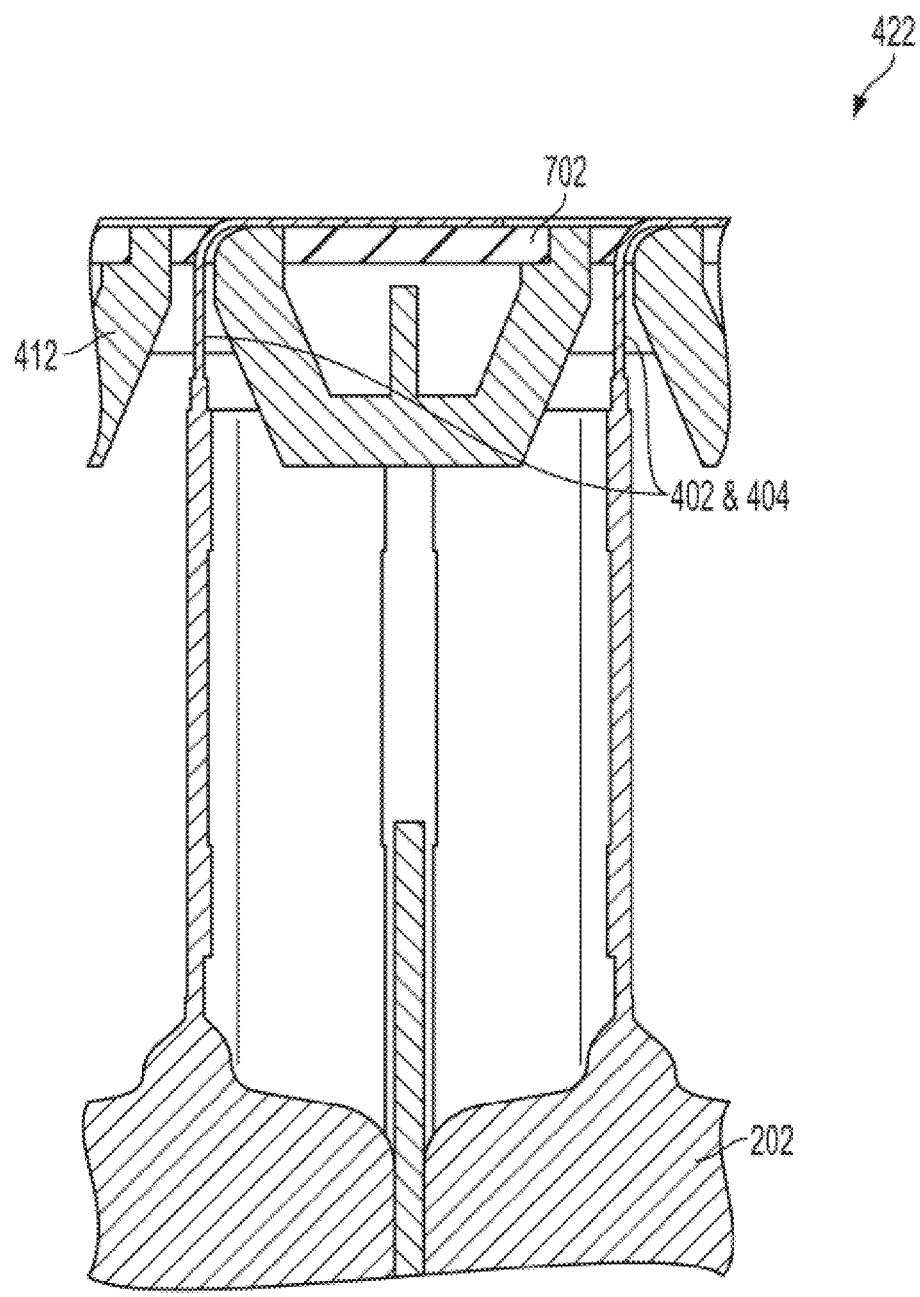
FIG. 24 is a side view, in cross-section, of a portion of the starter battery of FIG. 1 in the assembly arrangement of FIG. 16 before welding.

FIG. 24 is a cross sectional view of part of one of the stacked cell terminal columns 608 of the welding approach described in FIG. 23 where the battery cell terminals 402 overlay the isolated weld fingers 702 of the lower bus bar 414 and upper bus bars 416 are not used. Just as in FIGS. 14 and 15, the battery cell terminals 402 and 404 extend from the battery cells 202, through the support frame 412 which retains the isolated weld fingers 702 of the lower bus bar 414 and are folded over the isolated weld fingers 702. When the battery cell terminals 402 and 404 are sufficiently thick as depicted, welding the cell terminals 402 and 404 to the weld fingers directly to the isolated weld fingers 702 may be advantageous because the battery cell terminals 402 and 404 themselves may be less prone to damage than thinner battery cell terminals 402 and 404 and therefore upper bus bars 416 may not be necessary.

FIGS. 11-24 depict several approaches for welding the battery cell terminals 402 and 404 to the isolated weld fingers 702 of the lower bus bar 414, securing a flex circuit to the lower bus bar 414, and electrically connecting said battery cell terminals 402 and 404 to the flex circuit 418. The flex circuit 418 may either be detached or fixedly attached to upper bus bars 416 prior to welding. The battery cell terminals 402 and 404 may be sandwiched between the upper bus bars 416 and the isolated weld fingers 702 of the lower bus bar, or they may be directly secured to the isolated weld fingers 702 without the use of the upper bus bars 416. Thus, in one approach, the upper bus bars 416 and the flex circuit 418 may be fixedly attached to form a unified upper bus bar assembly 415. The upper bus bar assembly 415 may then be placed over the battery cell terminals 402 and 404, and the upper bus bar assembly 415, battery cell terminals 402 and 404, and the isolated weld fingers 702 may be welded together. The upper bus bar assembly 415 may be sized using a proper width, thickness, and material to carry all or a portion of the electrical current between individual parallel cell groups 206. In a second approach, the upper bus bars 416 and the flex circuit 418 may be separate prior to welding, but overlapping sections of the upper bus bars 416 and the flex circuit 418 may be used to weld together the upper bus bars 416, flex circuit 418, and lower bus bar 414. Additional welds may be used to weld together the upper bus bars 416, battery cell terminals 402 and 404, and isolated weld fingers 702. In a third approach, the flex circuit 418 and the upper bus bars 416 may be independently attached to the lower bus bar 414. Specifically, the flex circuit 418 may be directly welded onto the lower bus bar 414, and the upper bus bars 416 may be welded together with the battery cell terminals 402 and 404 and the isolated weld fingers 702 of the lower bus bar 414. Thus, the flex circuit 418 and the upper bus bars 416 may not be in physical contact with one another after welding. In a fourth approach, upper bus bars 416 may not be used, and the battery cell terminals 402 and 404 may be directly welded to the isolated weld fingers 702 of the lower bus bar 414. The flex circuit 418 may be directly attached to the lower bus bar 414 using ultrasonic welding or other type of joining technique. In the approaches where the flex circuit 418 is unattached to the upper bus bars 416, the lower bus bar 414 may carry part of all of the electrical current between parallel cell groups 206. The flex circuit sense tabs 1802 may only carry the much lower voltage sense current used to monitor the voltages of the battery cells 202.

Figure 25:
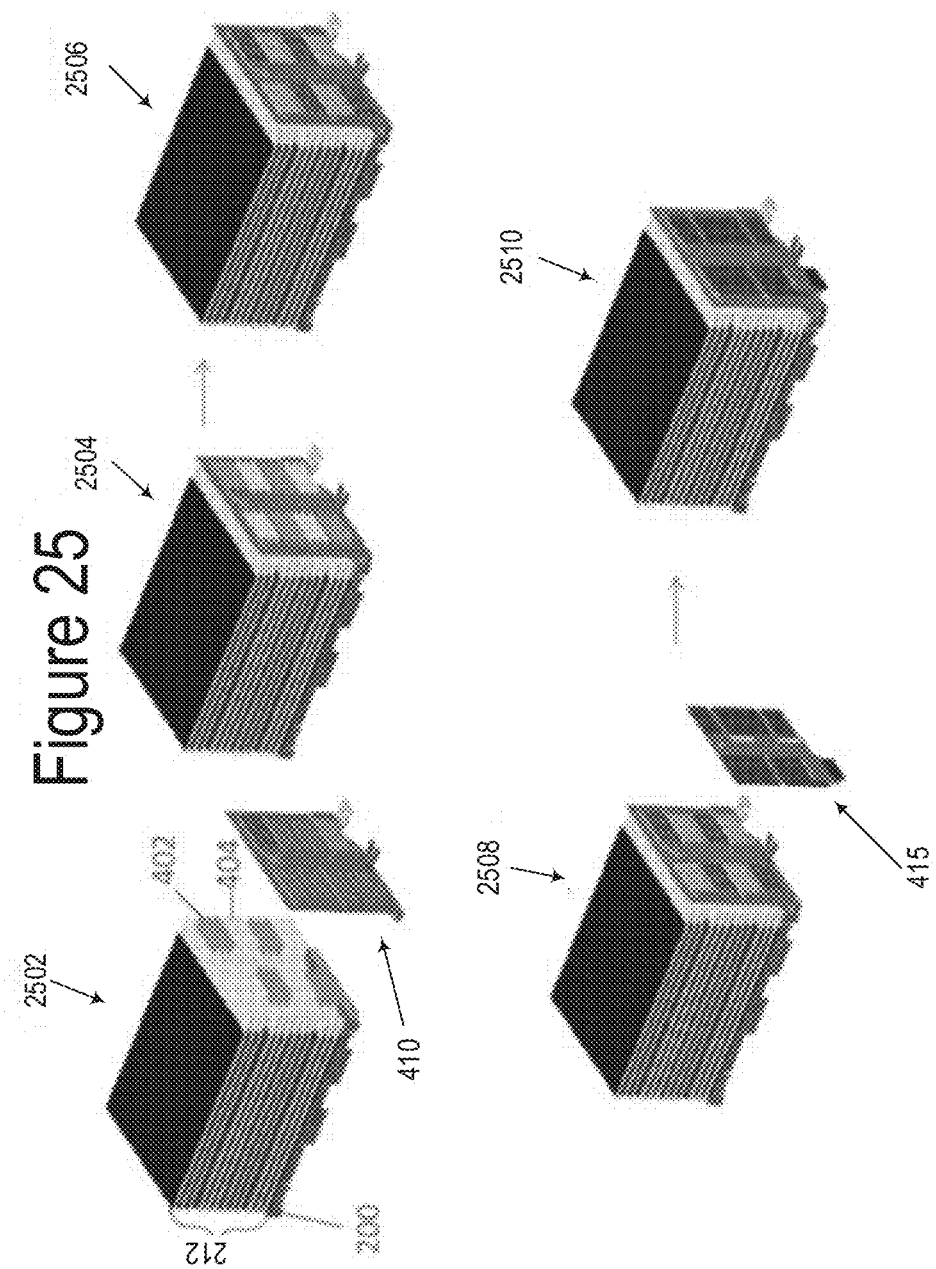
FIG. 25 is an assembly process diagram for the array.

FIG. 25 is an assembly process diagram for the three layer configuration of the lower bus bar assembly 410, battery cell terminals 402 and 404, and upper bus bar assembly 415. This process begins with the stacking of the battery cell array 212 onto the battery compression plate 200 such that the cell terminals 402 and 404 are arranged on one end of the cell array 212 such that the battery cell terminals form two cell terminals columns 608. The cell terminals 402 and 404 may be received by the lower bus bar assembly 410 by sliding through corresponding slits 420 in the lower bus bar assembly 410. This alignment step 2502 is followed by the lower bus bar assembly 410 engaging with the compression plate 200 such that the battery cell tabs 402 and 404 protrude through the lower bus bar assembly 410 resulting in a cell array 212 engaged with the lower bus bar assembly 410 in an intermediate step 2504. The battery cell terminals 402 and 404 are folded the lower bus bar assembly 410 over at 2506. The upper bus bar assembly 415 is aligned with the lower bus bar assembly 410 at 2508. At 2510, the upper bus bar assembly 415 may contact the lower bus bar assembly 410 and be aligned such that the battery cell terminals 402 and 404 are sandwiched between the upper bus bar assembly 415 and the lower bus bar assembly 410. Thus, the upper bus bar assembly may be sized to cover the battery cell terminals 402 and 404 and at 2510 the upper bus bar assembly 415 is ready to be welded to the battery cell terminals 402 and 404 and the lower bus bar assembly 410. It is important to note that the cell array 212 is oriented upside down in FIG. 25. As shown, the compression plate 200 is located on the bottom the cell array 212. However, the compression plate 200 is located directly beneath the lid 106 of the starter battery 100 at the 'top' of the starter battery 100.

Figure 26:
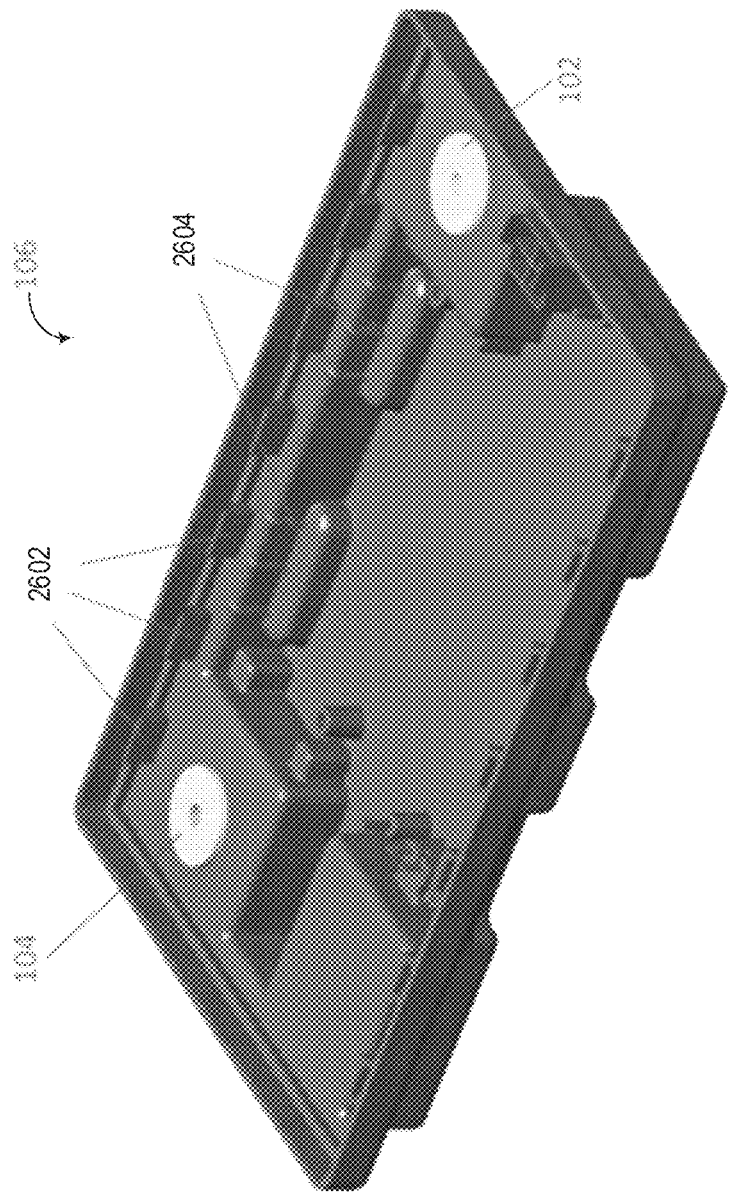
FIG. 26 is a perspective view of the lid.

FIG. 26 is a perspective view of the battery cell case lid 106 showing the internal details 2602 which may engage with the battery cell case tray 108, the battery compression plate 200 and the lower bus bar assembly 410. The battery cell case lid 106 may include alignment details 2602 which may engage with the corresponding alignment structures 406. The details 2602 may align, lock or secure the lid 106 with the battery case tray 108, and may be used to hold compression on the cell array 212 via interfacing with the compression plate 200 (or a combination thereof). The battery cell case lid 106 may also include alignment details 2604 which cooperate with the compression plate 200 using the details 2604 which are shown as a lip but can also be a ledge or recess which can receive the protrusions 502 of the compression plate 200 such that a force can be maintained on the battery cell array 212. The details 2602 serve to locate, align and secure the tray 108 to the lid 106. The details are strategically positioned around the perimeter to ensure proper engagement of the tray 108 as it is installed over the cell array 212 and thereby aligned properly with the corresponding attachment details on the lid. After assembly of the tray 108 to the lid 106, these features provide structural rigidity to the attachment interface. These features can also incorporate snaps to affix the lid 106 to the tray 108.

Figure 27:
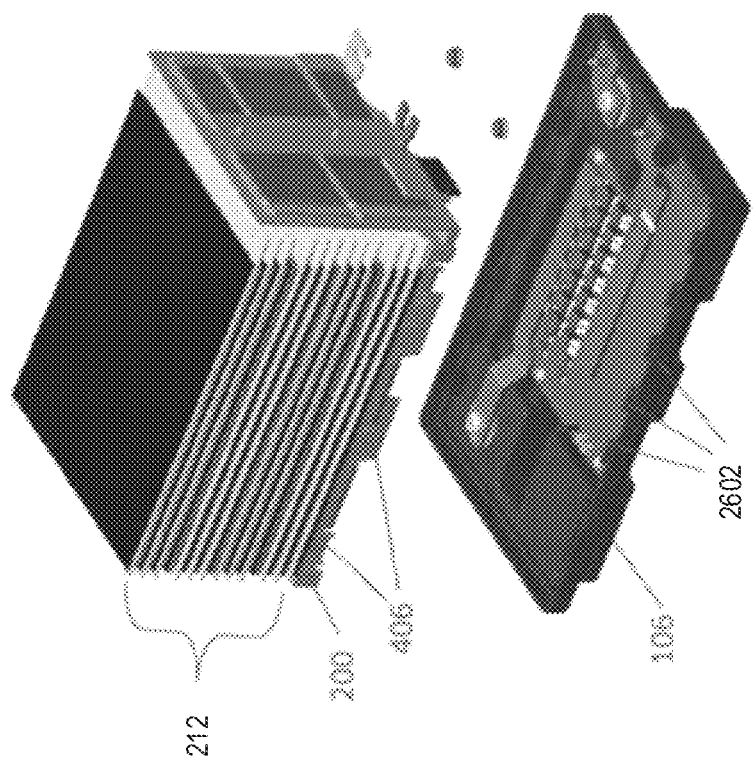
FIG. 27 is a perspective view of the array aligned with the lid.

FIG. 27 is a perspective view of the alignment of the battery cell array 212 and compression plate 200 with the battery cell lid 106 in which the battery case lid 106 details 2602 are shown to align with the corresponding compression case details 406.

Figure 28:
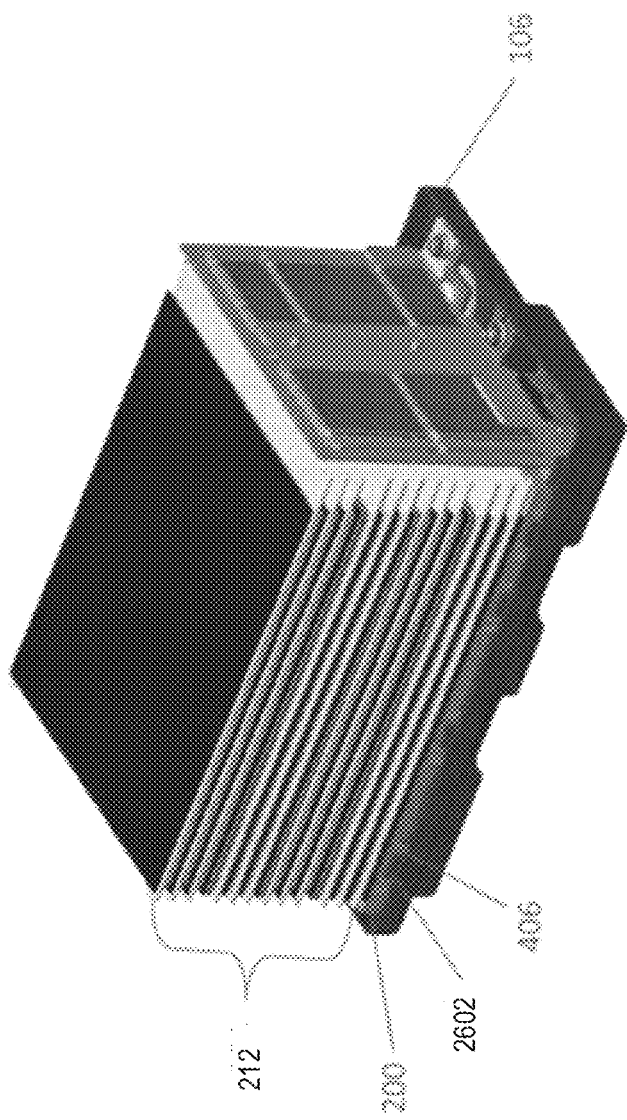
FIG. 28 is a perspective assembly view of the array and lid.

FIG. 28 is a perspective view of the battery cell array 212 and compression plate 200 mounted with the battery cell lid 106. The compression plate 200 and battery case lid 106 are aligned and secured by internal details 2602 of the lid 106 and the compression case details 406.

Figure 29:
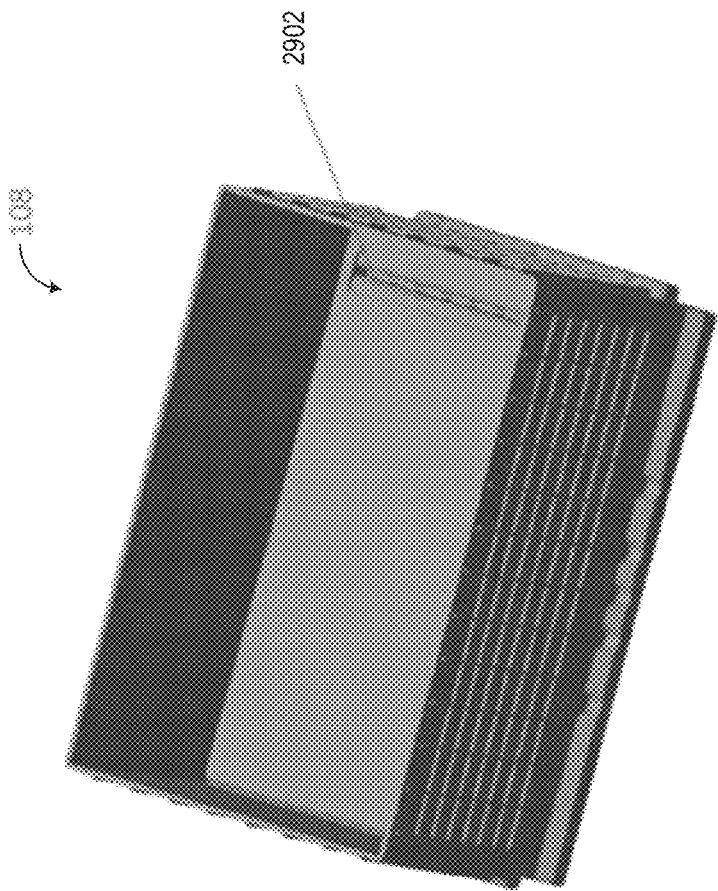
FIG. 29 is a perspective view of the tray.

FIG. 29 is a perspective view of the battery case tray 108 illustrating a recess 2902 for receiving the lower bus bar assembly 410 and upper bus bar assembly 415 to maintain alignment of a battery cell array 212.

Figure 30:
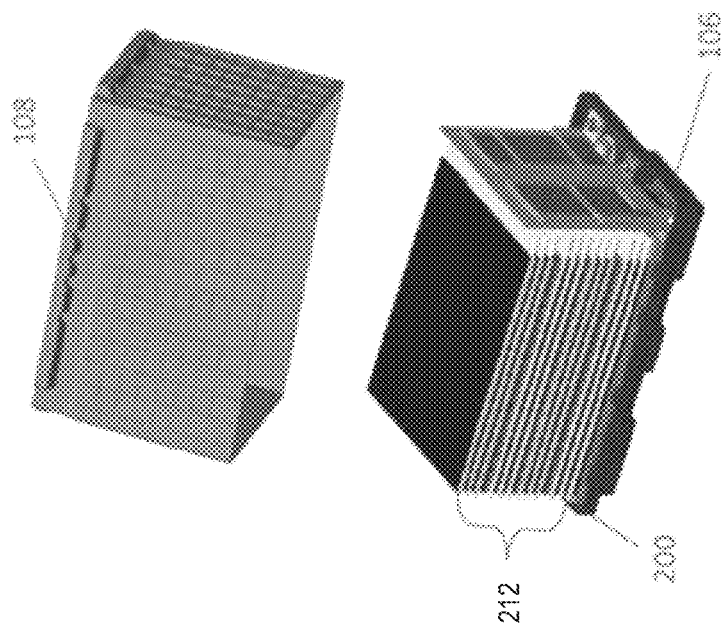
FIG. 30 is an exploded perspective view of the array and lid.

FIG. 30 is a perspective view of the battery cell tray 108 aligned with the battery cell array 212, battery compression plate 200 and battery case lid 106.

Figure 31:
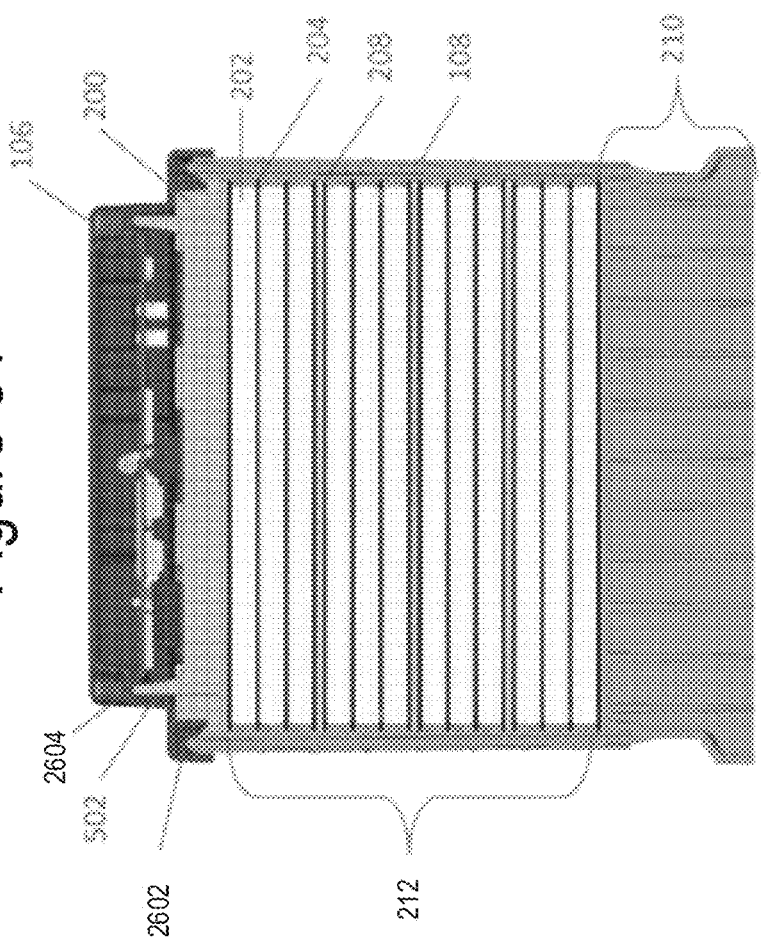
FIGS. 31 and 32 are front views, in cross-section, of the starter battery of FIG. 1.

FIG. 31 is a cross sectional view of the interface of the battery case lid 106, compression plate 200, battery cell array 212 and battery case tray 108. The battery case lid 106 cooperates with the compression plate 200. This can be accomplished by the protrusions 502 of the compression plate 200 contacting the battery case lid 106. The compressive force may be such to meet a target or desired initial operating pressure. An example initial operating pressure may be in the range of 4 to 15 psig, although some batteries may require greater pressures. This configuration may be used to provide an evenly distributed force to the battery array 212 to maintain an operating pressure on the array such that the battery cells 202, battery cell compliant pads 204 and electrical isolation spacers 208 between the compression plate 200 and the battery tray bottom 210 maintain an operating pressure. The operating pressure may increase to 35 psig or greater during charge/discharge cycles depending upon the battery chemistry. As such, the compressive force is sufficient to prevent cell delamination and constrain expansion or swelling of the cells at these pressures.

The internal details 2602 of the battery lid 106 align and secure the battery case tray 108 with the battery case lid 106. The lid 106 is affixed to the battery tray 108 to ensure a proper and adequate mechanical attachment and an environmentally-protective seal. The mechanical attachment is necessary to provide the compressive force needed to for the electrochemical interface between the anode and cathode. The compressive force also acts to prevent delamination of electrodes during operation. Electrode delamination reduces the performance and life of the battery cells 202.

The fastening and sealing between tray 108 and lid 106 can be accomplished in a single operation, such as welding or adhesive bonding. The arrangement of the lid 106 and tray 108 lends itself readily to plastic welding methods such as hot-plate, infrared, ultrasonic or laser welding. The internal details 2602 may include integrated snaps which can be used in conjunction with the welding as either the primary or secondary structural attachment.

The fastening can also be accomplished with snaps or separate fasteners between the lid 106 and tray 108, and the sealing can separately be accomplished with a gasket or similar seal.

Figure 32:
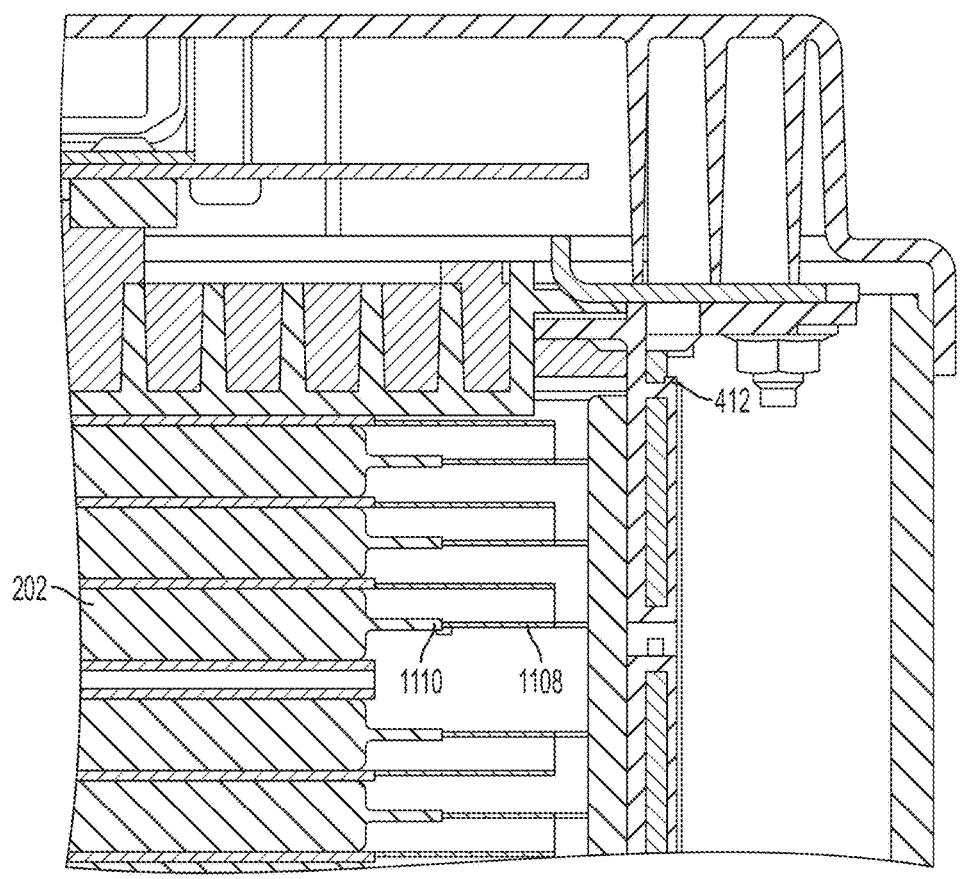

FIG. 32 is a cross sectional view of the interface of the battery cells 202 with a thermistor 1110. The thermistor 1110 may be mounted on a flex circuit tab 1108 which is bent through an opening in the lower bus bar assembly 410 so that the thermistor 1110 is in proximity with the battery cells 202 as explained in FIG. 11. It may be desirable to size the flex circuit tab 1108 such that the thermistor 1110 may extend into and contact the battery cells 202 at a location desirable to measure the temperatures of the battery cells 202.

Figure 33:
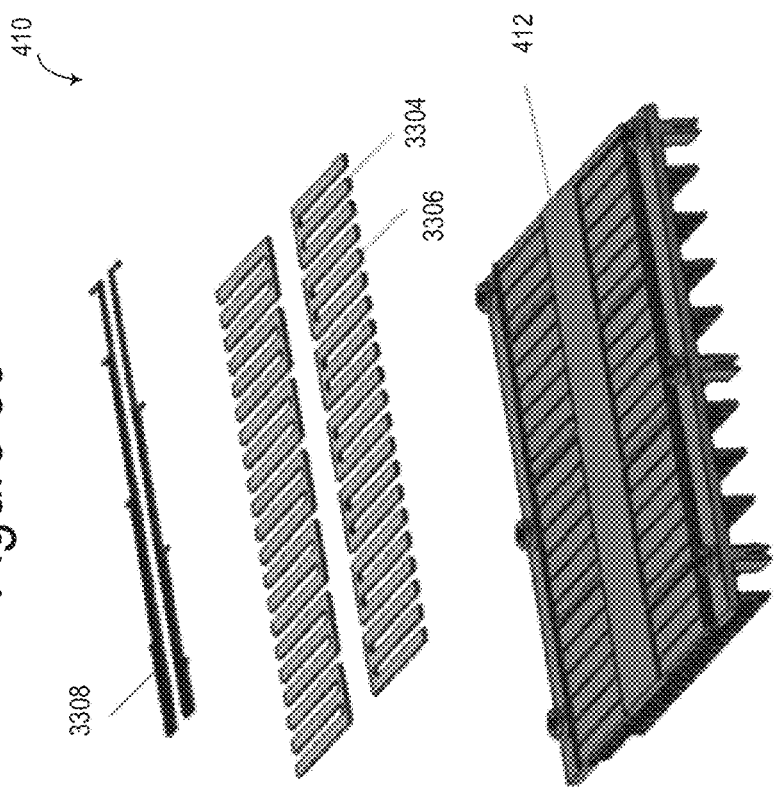
FIG. 33 is an exploded view of another lower bus bar assembly.

FIG. 33 is an exploded view of another embodiment of the lower bus bar assembly 410, including the common lower bus bar support frame 412, Cu lower bus bar fingers 3304 and Al lower bus bar fingers 3306, and a circuit 3308 for electrically connecting to a thermistor (not shown).

Figure 34:
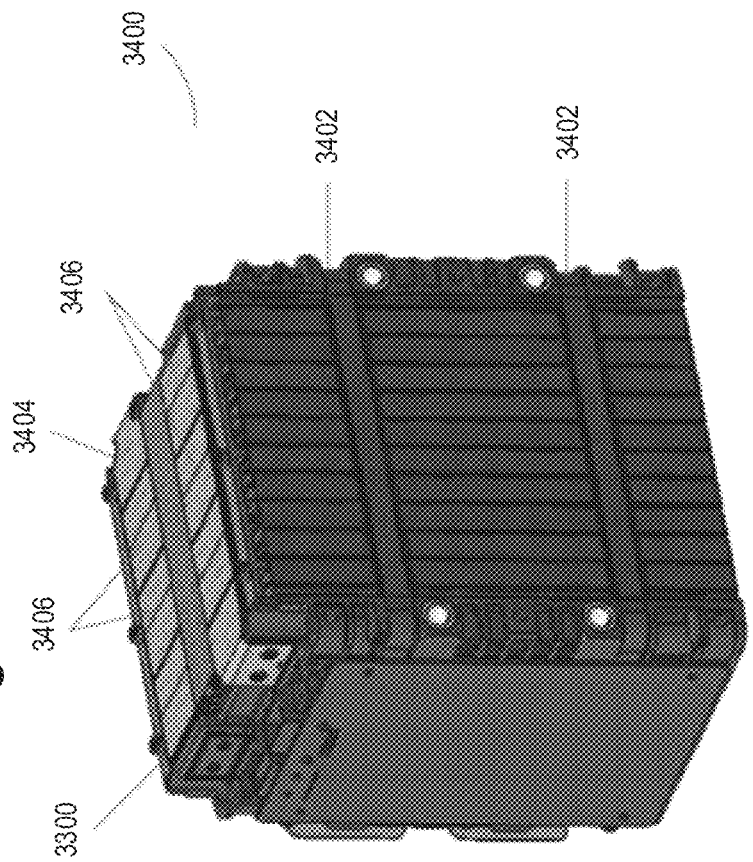
FIG. 34 is a perspective view of another embodiment of the starter battery from FIG. 1.
Figure 35:
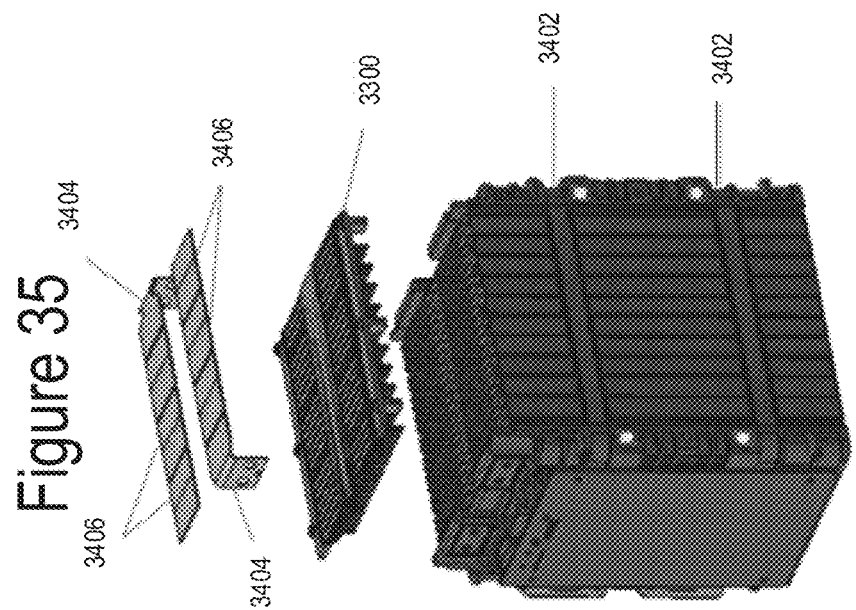
FIG. 35 is an exploded perspective view of the starter battery of FIG. 1 under the embodiment as described in FIG. 27.

Another embodiment of the structure and assembly arrangement of the starter battery 100 is provided in FIGS. 34 and 35. FIG. 34 is a perspective view of another embodiment of the starter battery 100 with a lower bus bar 3300 and upper bus bars 3404 and 3406. The upper bus bar 3406 may be a bi-metallic bus bar, and the bus bar 3404 may be a single metal bus bar 3406. The lower bus bar 3300 is used to electrically connect the battery cells in parallel, series, or a combination thereof.

FIG. 35 is an exploded view of the starter battery 100 under the embodiment described in FIG. 34 with a bi-metallic upper bus bar 3406, single metal bus bar 3406, and a lower bus bar assembly 3300. When welded together, the upper bus bars 3404 and 3406 may electrically connect the battery cell terminals 402 and 404 (not shown) of the starter battery 100.

Figure 36:
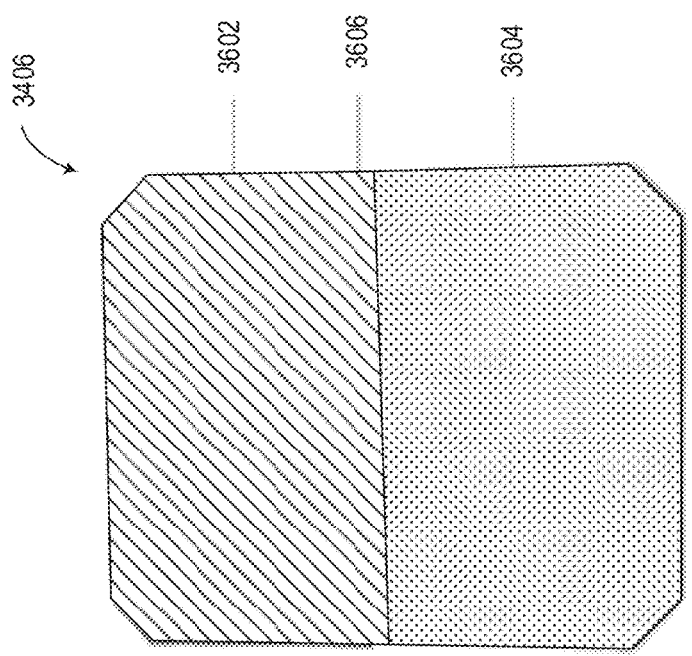
FIG. 36 is a plain view of a bi-metallic bus bar.

FIG. 36 is an illustration of a bi-metallic bus bar 3406 with a Cu section 3602 and an Al section 3604 that are joined at a weld 3606. This joint may be formed by a laser weld, ultrasonic weld, or other method.

In this way, a starter battery may be assembled and manufactured in a variety of manners depending on the specific type of starter battery. More specifically, the arrangement, welding, and electrical connection between a plurality of bus bars, battery cell terminals, and a flex circuit may be modified to suit the specifications of the starter battery. A starter battery may include a plurality of prismatic cells each having one or more terminals extending therefrom through one or more lower bus bars and folded over said bus bars. The battery cell terminals may be arranged in parallel groups to meet the current and/or voltage demands of the battery. In one approach, the cell terminals may be welded directly to the lower bus bar. In other approaches, an upper bus bar may be placed over the cell terminals, sandwiching the cell terminals between the upper and lower bus bars. The three layer arrangement of lower bus bar, cell terminals, and upper bus bar may be welded together. The upper bus bar may be fixedly attached to the flex circuit prior to welding. The upper bus bars may also be attached to the flex circuit during welding, or be independent of the flex circuit. The flex circuit may be electrically and physically coupled to the battery cell terminals and carry an electrical sensing current and/or cell balancing current. The upper and lower bus bars may carry all or a portion of the current between the battery cell terminal groups. Each approach to the welding and electrical coupling of the battery cell terminals offers certain advantages depending on the specific type of starter battery being manufactured.

While exemplary embodiments are described above, it is not intended that these embodiments describe all possible forms of the invention. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The invention claimed is:

1. A starter battery comprising:
a dielectric frame comprising a plurality of first slots;
a lower first bus bar disposed on the dielectric frame, the lower first bus bar comprising a plurality of weld members and a plurality of second slots, the plurality of second slots aligned with the plurality of first slots of the dielectric frame;
a plurality of prismatic cells stacked to form an array, each of the plurality of prismatic cells having a positive cell tab and a negative cell tab projecting through one of the plurality of first slots, and through a corresponding one of the plurality of second slots, where each of the positive cell tabs and each of the negative cell tabs of the plurality of prismatic cells is folded over the lower first bus bar with a bend radius, and where each of the positive cell tabs and each of the negative cell tabs are bent in a same direction, where each of the positive and negative cell tabs is folded over one of the plurality of weld members, and where each of the positive and negative cell tabs has a side facing the cell array and an opposite side; and an upper second bus bar positioned on top of the positive and negative cell tabs of the plurality of prismatic cells such that the positive and negative cell tabs are disposed between the lower first bus bar and the upper second bus bar;

wherein the plurality of weld members of the lower first bus bar contact the sides of the positive and negative cell tabs facing the cell array while the upper second bus bar contacts the opposite sides of the positive and negative cell tabs.

2. The starter battery of claim 1 further comprising:
a flex circuit disposed on the dielectric frame, electrically connected to the positive and negative cell tabs and capable of carrying one or more of a voltage sensing current and a cell balancing current.

3. The starter battery of claim 2, wherein the flex circuit is bonded and electrically connected to the lower first bus bar.

4. The starter battery of claim 3, wherein the lower first bus bar and the flex circuit are electrically connected to the positive and negative cell tabs and are capable of carrying all or a part of a battery current between the plurality of prismatic cells.

5. The starter battery of claim 2, wherein the flex circuit is bonded to the dielectric frame.

6. The starter battery of claim 5, wherein the plurality of weld members is electrically connected to the positive and negative cell tabs and is capable of carrying all or a part of a battery current between the plurality of prismatic cells.

7. A starter battery comprising:
a dielectric frame defining a plurality of slots and supporting a first bus bar, wherein the first bus bar comprises a plurality of weld members;

a plurality of prismatic cells stacked to form an array, each of the plurality of prismatic cells having positive tabs and negative tabs, where each positive and negative tab projects through a corresponding one of the plurality of slots, and where both the positive tabs and the negative tabs are folded over with a bend radius, and where each of the positive tabs and each of the negative tabs are bent in a same direction and bonded to one of the plurality of weld members;

a second bus bar positioned on top of the positive tabs and the negative tabs of the plurality of prismatic cells such that the positive tabs and the negative tabs are disposed between the first bus bar and the second bus bar; and a flex circuit disposed on the dielectric frame, electrically connected to the positive and negative tabs, capable of carrying all or part of one or more of a voltage sensing current and a cell balancing current, which is capable of distributing current amongst battery cells;

wherein the plurality of weld members of the first bus bar contact sides of the positive tabs and the negative tabs facing the array while the second bus bar contacts opposite sides of the positive tabs and the negative tabs.

8. The starter battery of claim 7, wherein the plurality of weld members is electrically connected to the positive and negative tabs and is capable of carrying all or a portion of a battery current between the plurality of prismatic cells.

9. The starter battery of claim 1, wherein each of the positive and negative tabs is welded to a distinct one of the plurality of weld members.

10. The starter battery of claim 1, wherein the first lower bus bar, the positive and negative tabs of the plurality of prismatic cells, and the upper second bus bar are welded together.

* * * * *